United States Patent
Hoshino et al.

(10) Patent No.: US 7,240,156 B2
(45) Date of Patent: Jul. 3, 2007

(54) STORAGE SUBSYSTEM AND STORAGE SUBSYSTEM CONTROL METHOD

(75) Inventors: Sachiko Hoshino, Odawara (JP); Takashi Sakaguchi, Odawara (JP); Yasuyuki Nagasoe, Odawara (JP); Shoji Sugino, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/328,057

(22) Filed: Jan. 10, 2006

(65) Prior Publication Data

US 2006/0112225 A1 May 25, 2006

Related U.S. Application Data

(63) Continuation of application No. 10/822,725, filed on Apr. 13, 2004.

(30) Foreign Application Priority Data

Feb. 5, 2004 (JP) ............... 2004-029028

(51) Int. Cl.
*G06F 12/06* (2006.01)
(52) U.S. Cl. .............. 711/114; 711/118; 711/154; 711/173; 711/209; 710/54
(58) Field of Classification Search ........... 711/114, 711/118, 154, 113, 173, 209; 710/54
See application file for complete search history.

(56) References Cited

U.S. PATENT DOCUMENTS 5,568,629 A 10/1996 Gentry et al.
5,657,470 A 8/1997 Fisherman et al.
5,829,053 A 10/1998 Smith et al.
6,115,787 A 9/2000 Obara (Continued)

FOREIGN PATENT DOCUMENTS

EP 0389151 9/1990

(Continued)

OTHER PUBLICATIONS

Buck, A. L. et al., "The Storage Server as Virtual Volume Manager", IEEE Comput. Soc., Apr. 1993, USA 26-29, pp. 79-86.

(Continued)

*Primary Examiner*—Pierre-Michel Bataille
(74) *Attorney, Agent, or Firm*—Mattingly, Stanger, Malur & Brundidge, P.C.

(57) ABSTRACT

The present invention partitions a cache region of a storage subsystem for each user and prevents interference between user-dedicated regions.

A plurality of CLPR can be established within the storage subsystem. A CLPR is a user-dedicated region that can be used by partitioning the cache region of a cache memory. Management information required to manage the data stored in the cache memory is allocated to each CLPR in accordance with the attribute of the segment or slot. The clean queue and clean counter, which manage the segments in a clean state, are provided in each CLPR. The dirty queue and dirty counter are used jointly by all the CLPR. The free queue, classification queue, and BIND queue are applied jointly to all the CLPR, only the counters being provided in each CLPR.

18 Claims, 18 Drawing Sheets

U.S. PATENT DOCUMENTS

| | | | |
|---|---|---|---|
| 6,148,368 A | 11/2000 | DeKoning | |
| 6,256,705 B1 | 7/2001 | Li et al. | 711/112 |
| 6,275,824 B1 | 8/2001 | O'Flaherty et al. | |
| 6,275,825 B1 | 8/2001 | Kobayashi et al. | |
| 6,275,898 B1 | 8/2001 | DeKoning | |
| 6,289,398 B1 | 9/2001 | Stallmo et al. | |
| 6,341,331 B1 | 1/2002 | McNutt | |
| 6,347,358 B1 | 2/2002 | Kuwata | |
| 6,425,049 B1 | 7/2002 | Yamamoto et al. | |
| 6,502,162 B2 | 12/2002 | Blumenau et al. | |
| 6,502,193 B1 | 12/2002 | Barber | |
| 6,507,905 B1 | 1/2003 | Hubacher et al. | |
| 6,519,679 B2 | 2/2003 | Devireddy et al. | |
| 6,615,324 B1 | 9/2003 | Fernald | |
| 6,665,786 B2 | 12/2003 | McMichael et al. | |
| 6,715,031 B2 | 3/2004 | Camble et al. | |
| 6,772,287 B2 | 8/2004 | Uchiyama et al. | |
| 6,851,022 B2 | 2/2005 | Ikeuchi et al. | |
| 2002/0095602 A1 | 7/2002 | Pherson et al. | |
| 2002/0099837 A1 | 7/2002 | Oe et al. | |
| 2002/0103913 A1 | 8/2002 | Tawil et al. | |
| 2002/0104008 A1 | 8/2002 | Cochran et al. | |
| 2003/0023868 A1 | 1/2003 | Parent | |
| 2003/0055933 A1 | 3/2003 | Ishizaki et al. | |
| 2003/0055972 A1 | 3/2003 | Fuller et al. | |
| 2003/0084241 A1 | 5/2003 | Lubbers et al. | |
| 2003/0115434 A1 | 6/2003 | Mahalingam et al. | |
| 2003/0115447 A1 | 6/2003 | Pham et al. | |
| 2003/0182501 A1 | 9/2003 | George et al. | |
| 2003/0196055 A1 | 10/2003 | Kamano et al. | |
| 2004/0010563 A1 | 1/2004 | Forte et al. | |
| 2004/0049564 A1 | 3/2004 | Ng et al. | |
| 2004/0064729 A1 | 4/2004 | Yellepeddy | |
| 2004/0111557 A1 | 6/2004 | Nakatani et al. | |
| 2004/0111596 A1 | 6/2004 | Rawson, III | |
| 2004/0139168 A1 | 7/2004 | Tanaka et al. | |
| 2004/0193795 A1 | 9/2004 | Takeda et al. | 711/113 |
| 2004/0193803 A1 | 9/2004 | Mogi et al. | |
| 2004/0221105 A1* | 11/2004 | Fujimoto et al. | 711/114 |
| 2005/0010722 A1 | 1/2005 | Chen | |
| 2005/0015546 A1 | 1/2005 | Zohar et al. | |
| 2005/0132256 A1 | 6/2005 | Watanabe et al. | 714/113 |
| 2005/0144380 A1* | 6/2005 | Suzuki et al. | 711/113 |
| 2005/0149677 A1* | 7/2005 | Shimada et al. | 711/114 |
| 2005/0152251 A1* | 7/2005 | Harumatsu | 369/53.2 |
| 2005/0193165 A1 | 9/2005 | Sakaguchi et al. | 711/113 |

FOREIGN PATENT DOCUMENTS

| | | |
|---|---|---|
| JP | 264940 | 9/1992 |
| JP | 05-128002 | 5/1993 |
| JP | 07-129470 | 5/1995 |
| JP | 2002-149599 | 5/2002 |
| JP | 2002-230189 | 8/2002 |
| JP | 2003-157177 | 5/2003 |
| JP | 2003-323340 | 11/2003 |
| JP | 2004-238539 | 8/2004 |

OTHER PUBLICATIONS

Gelb, J.P. "System-Managed Storage", IBM Systems Journal, vol. 28, No. 1, Jan. 1989, pp. 7 103.

Kaczmarski, M. et al., "Beyond Backup Toward Storage Management", IBM Systems Journa vol. 42, No. 2, 2003, pp. 322-337.

Freedom Storage Lightning 9900 V Series, User and Ref. Guide to Hitachi Data Systems, 200.

* cited by examiner

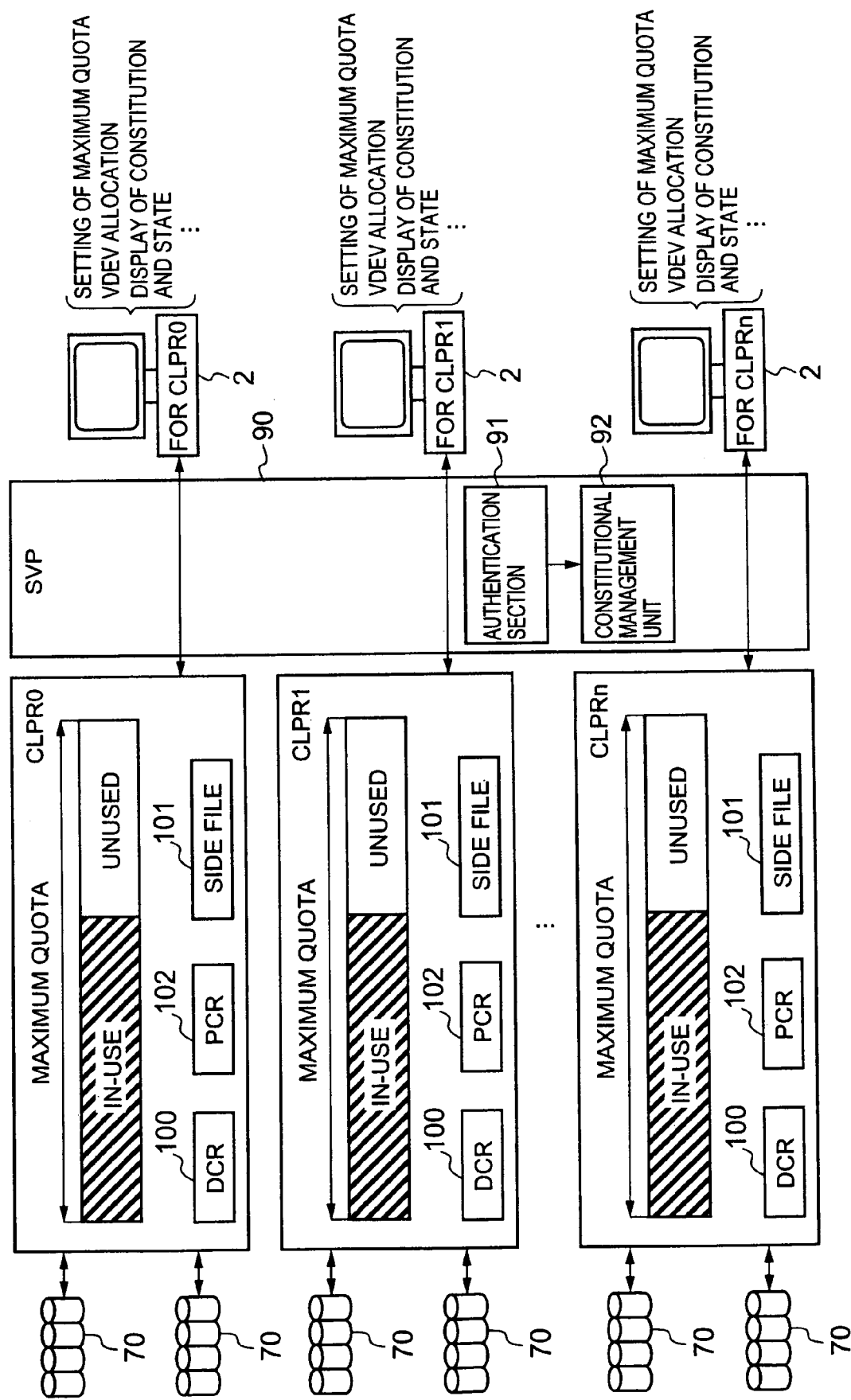

STORAGE SUBSYSTEM AND STORAGE SUBSYSTEM CONTROL METHOD

CROSS-REFERENCE TO RELATED APPLICATIONS

The present application is a continuation of application Ser. No. 10/822,725, filed Apr. 13, 2004 which is related to and claims priority from Japanese Patent Application No. 2004-029028 filed on Feb. 5, 2004, the entire disclosure of which is incorporated herein by reference.

BACKGROUND OF THE INVENTION

The present invention relates to a storage subsystem and a storage-subsystem control method.

A storage subsystem is capable of providing a host computer with large-capacity and high performance storage services. In a storage subsystem, a multiplicity of disk drives is arranged in the form of an array and storage regions based on RAID (Redundant Array of Independent Inexpensive Disks) are constructed, for example. Logical volumes constituting logical storage regions are formed in the physical storage region that each disk drive comprises. An LUN (Logical Unit Number) is associated beforehand with each logical volume. The host computer issues a write command or read command of a predetermined format to the storage subsystem by specifying an LUN or block address. As a result, the host computer is able to write and read desired data to and from the storage subsystem.

A plurality of host computers can be connected to the storage subsystem. Problems sometimes arise when a data group managed by a certain host computer or application program can be read or written by another host computer or application program. Therefore, access control technology such as zoning, LUN masking, and so forth, for example, may be used. Zoning is a technology that sets one or a plurality of zones in the storage subsystem and allows a data transfer to only a specified communication port or WWN (World Wide Name) that belongs to the zone. LUN masking is a technology that allows a specified host computer access to a specified LUN.

Therefore, the exchange of data between a host computer and a disk drive is executed via cache memory. When a write command is output by the host computer, data is temporarily stored in cache memory and then written to the disk drive, for example. Further, when a read command is output by the host computer, data that is read from the disk drive is supplied to the host computer via the cache memory, for example. Therefore, technology that suitably allocates a cache memory quota to a disk drive is also known (Japanese Patent Application Laid Open No. H4-264940).

Access restrictions that restrict access by a host computer to the storage subsystem can be established by means of conventional zoning, LUN masking, and so forth. However, with the conventional technology, only simple access restrictions for a logical volume are possible and partition management for the resources of the storage subsystem is not implemented, meaning that ease of use is poor. In cases where the storage subsystem is used jointly by a plurality of users, when a certain user issues a large quantity of input/output requests (IO requests), for example, multiple cache-memory regions are used to process these requests. Therefore, sufficient cache memory cannot be used for the input/output processing by other users and the service capacity of the subsystem as a whole is reduced. That is, in providing one user with services, services supplied to another user are affected.

Further, although, according to the technology of Japanese Patent Application No. H4-264940, cache memory is allocated to each storage device, data stored in cache memory is efficiently written to the storage devices but resource (cache memory) partition management is not performed in order to service a plurality of users.

SUMMARY OF THE INVENTION

Accordingly, an object of the present invention is to provide a storage subsystem that allows a cache region to be allocated to and jointly used by a plurality of users respectively and is capable of reducing the effect on another user due to services supplied to a certain user, and relates to a storage-subsystem control method.

Another object of the present invention is to provide a storage subsystem that allows resources to be allocated flexibly to a plurality of users and management to be performed by means of a smaller amount of information so that the scope of management of each user is not affected, and a storage-subsystem control method.

A further object of the present invention is to provide a storage subsystem that allows cache resources to be logically partitioned and used by constituting management information in accordance with a cache-memory management unit, and a storage-subsystem control method. Further objects of the present invention will become apparent from the description of the embodiments described below.

BRIEF DESCRIPTION OF THE DRAWINGS

FIG. 18 is an explanatory view of an aspect where information relating to each CLPR is displayed on a sub-management terminal.

DESCRIPTION OF THE PREFERRED EMBODIMENTS

Figure 1:
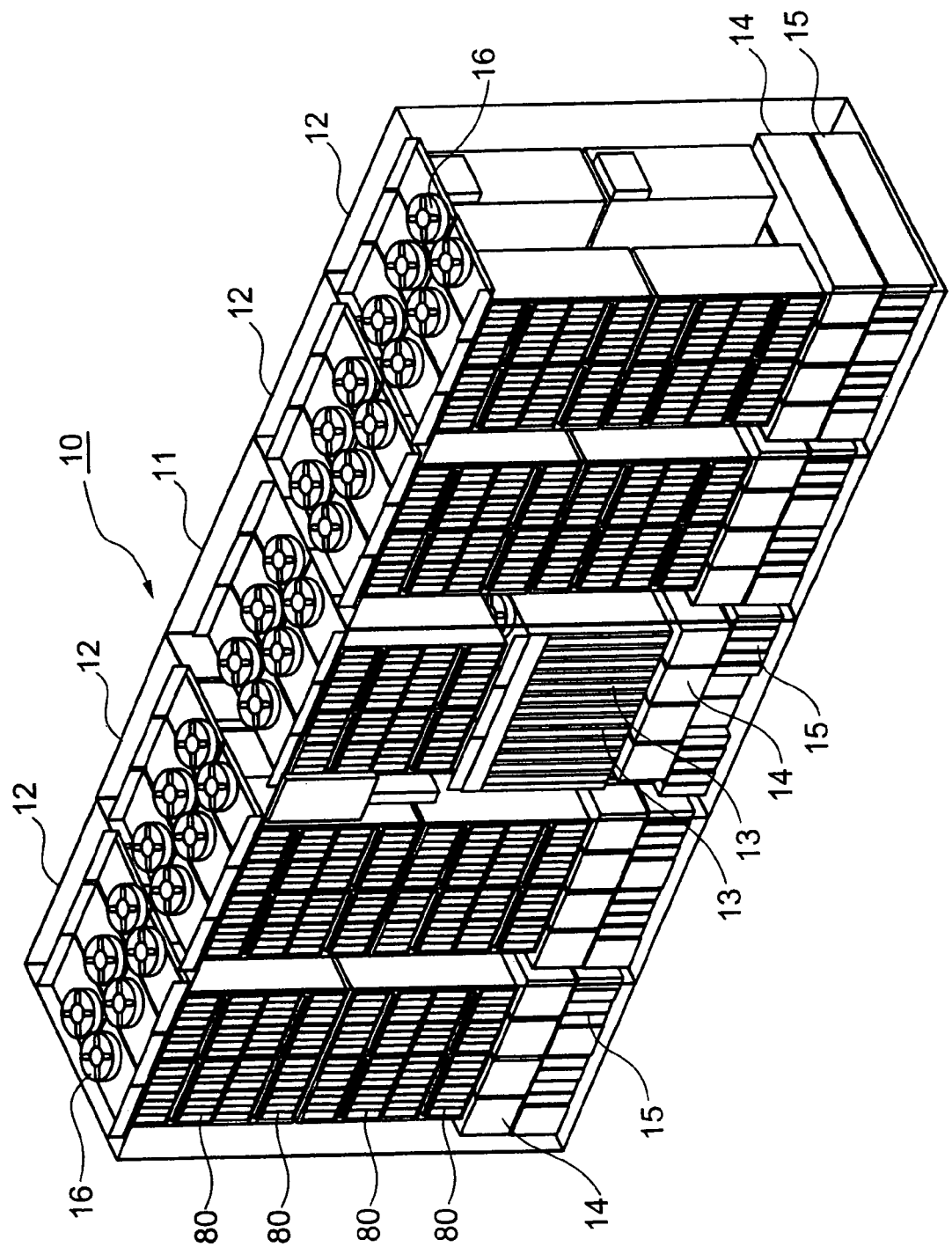
FIG. 1 is an external view of the storage subsystem according to an embodiment of the present invention.

In order to resolve the above problem, the storage subsystem according to the present invention comprises a plurality of channel adapters that each control the exchange of data with a host device; a plurality of storage device groups that each provide a logical storage region; a plurality of disk adapters that each control the exchange of data with each of the storage device groups; a cache memory that is used by each of the channel adapters and each of the disk adapters; a plurality of cache partition regions constituted by logically partitioning the cache memory; and a control memory that stores management information for managing each of the cache partition regions. Further, the management information is constituted by partition management information items provided in each of the cache partition regions, and common management information that is applied to all of the cache partition regions.

The cache memory and control memory can also be mounted as separate memory substrates or a memory substrate on which both memories are mixed may be used. In addition, a certain region of the memory may be used as the cache memory while another region is used as the control memory. The cache memory is used to store temporarily (or for long periods) data that is exchanged between the host device and the storage device groups. The cache memory is logically partitioned into a plurality of cache partition regions. The cache partition regions are each individually managed by means of management information. Each of the cache partition regions can be provided for (allocated to) each channel adapter, for example. Further, each of the cache partition regions can be used by a different user, for example. The management information is constituted by partition management information and common management information. The partition management information is information that is provided in each of the cache partition regions. The common management information is information that is applied to all the cache partition regions. Because the management information is constituted by the partition management information and the common management information, the storage resources of the control memory can be used efficiently and a plurality of cache partition regions can be used individually.

The partition management information items and the common management information can be established based on the attribute of a cache management unit. Examples of the cache management unit can include slots, segments, or the like. One slot can be constituted by at least one or more segments, and one segment has a data size of about 16 KB, for example. Examples of attributes of the cache management unit can include a free state, dirty state, and clean state. 'Free state' indicates a state where the cache management unit is unused. A 'dirty state' indicates a state where data stored in the cache management unit has not been written to a storage device. A 'clean state' indicates a state where data stored in the cache management unit has been written to the storage device. There are sometimes cases where it is preferable to provide individual management information in each of the cache partition regions depending on the attribute of the cache management unit. Conversely, there is also management information that can be applied to all the cache partition regions depending on the attribute of the queue management unit.

For example, in cases where management information is constituted by submanagement information of a plurality of types, some of the submanagement information is provided partitioned for each of the cache partition regions, while the remaining submanagement information can be applied to all the cache partition regions. In this case, the decision of whether to use any of the submanagement information as partition management information or to use any of the submanagement information as common management information can be made based on the attribute of the cache management unit.

For example, the management information can be constituted including queues of a plurality of types, and counters that are associated with each of the queues. In this case, the partition management information items can be constituted by providing some of the queues and counters in each of the cache partition regions based on the attribute of the cache management unit. Further, the remainder of the queues and the remainder of the counters can be used as the common management information. 'On the basis of the attribute of the cache management unit' can also be stated as 'on the basis of the attribute of the queue (and counter)'.

Here, one of the mutually associated queue and counter can constitute the partition management information, and the other can be used as the common management information. In other words, of the mutually associated queue and counter, only the counter can be partitioned and allocated to each of the cache partition regions, for example.

In addition, a queue management table can be associated with each queue. Next, the queue management table associated with a queue that constitutes the partition management information can be provided in each of the cache partition regions. That is, because a queue and queue management table are always used integrally, in cases where a queue is provided in each of the cache partition regions, a queue management table is also provided in each cache partition region.

The management information can be constituted including: a free queue to which a cache management unit in an unused state is connected and a free queue counter associated with the free queue; a dirty queue to which a cache management unit for storing data in a dirty state prior to reflection in the storage device group is connected and a dirty queue counter associated with the dirty queue; a clean queue to which a cache management unit for storing data in a clean state that has been reflected in the storage device group is connected and a clean queue counter associated with the clean queue; and a in-use counter that counts the total capacity of the in-use cache management unit. Further, the free queue counter, the clean queue, the clean queue counter and the in-use counter can be provided in each of the cache partition regions as partition management information. In addition, the free queue, the dirty queue, and the dirty queue counter can be used as the common management information.

A new cache partition region can also be established by establishing one cache partition region among the cache partition regions as a common region and allocating resources belonging to the common region. For example, in an initial state, all the cache regions are used as the common region. Then, when a cache partition region is newly generated, a partical cache region is taken from the common region and allocated to the new cache partition region. Further, when a cache partition region is deleted, the cache region allocated to this cache partition region may be returned to the common region.

The embodiment of the present invention will be described hereinbelow based on FIGS. 1 to 18. The present embodiment discloses a storage subsystem that comprises: a plurality of upper interface control units that each control the exchange of data with a host device; a plurality of storage device groups that each provide a logical storage region; a plurality of lower interface control units that each control the exchange of data with each of the storage device groups; and a memory section that is used by each of the upper interface control units and each of the lower interface control units. Further, in this embodiment, a cache region provided by the memory section is partitioned into a plurality of cache partition regions. In addition, in this embodiment, management information is partitioned for each of the cache partition regions in accordance with the attribute of a cache management unit for managing data in the memory section; and data is managed in each of the cache partition regions on the basis of each of the management information items.

FIG. 1 is an outline perspective view of the external constitution of a storage subsystem 10. The storage subsystem 10 can be constituted by a basic enclosure 11 and a plurality of additional enclosures 12, for example. The basic enclosure 11 is the minimal constitutional unit of the storage subsystem 10 and comprises both a storage function and a control function. The additional enclosures 12 are options of the storage subsystem 10 and are controlled by the control functions provided for the basic enclosure 11. For example, a maximum of four additional enclosures 12 can be connected to the basic enclosure 11.

A plurality of control packages 13, a plurality of power supply units 14, a plurality of battery units 15, and a plurality of disk drives 80 are detachably provided in the basic enclosure 11. A plurality of disk drives 80, a plurality of power supply units 14, and a plurality of battery units 15 are detachably provided in additional enclosures 12. Further, a plurality of cooling fans 16 are provided in the basic enclosure 11 and in each of the additional enclosures 12.

The control package 13 is a module for the respective implementation of a channel adapter 20, disk adapter 30 and cache memory 40, and so forth, which will be described subsequently. That is, a plurality of channel adapter packages, a plurality of disk adapter packages and one or more memory packages are detachably provided in the basic enclosure 11 and can be exchanged in package units.

Figure 2:
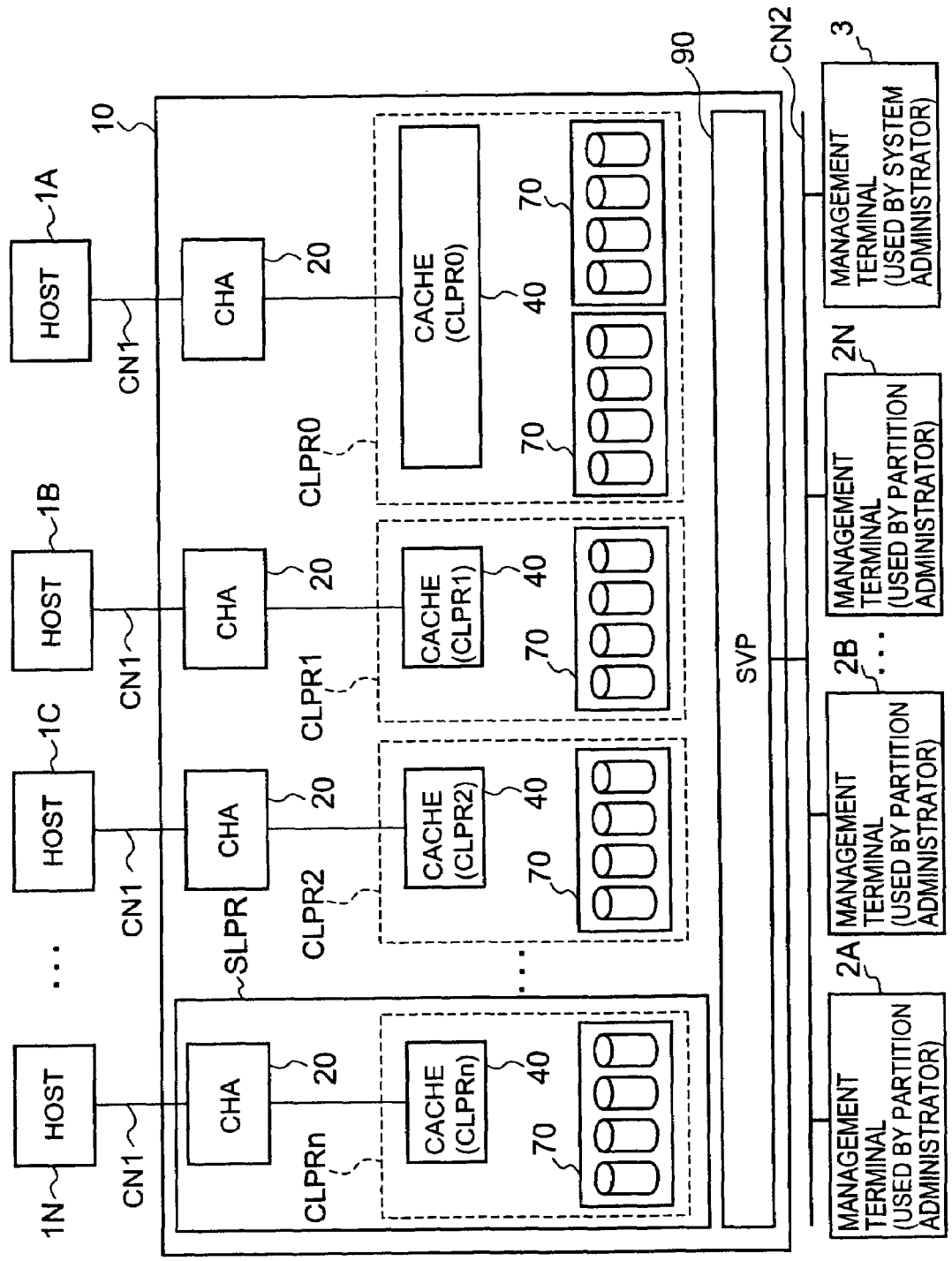
FIG. 2 is a block diagram showing the logical outline constitution of the storage subsystem.

FIG. 2 is a block diagram showing the overall outline of a storage system that comprises the storage subsystem 10. The storage subsystem 10 is connected in a manner permitting bidirectional communication to a plurality of host computers 1A to 1C (referred to hereinafter as 'host computer 1' when no particular distinction is made) via a communication network CN1. Here, the communication network CN1 is a LAN (Local Area Network), a SAN (Storage Area Network), the Internet or a dedicated line, or the like, for example. When a LAN is used, data transfers between the host computer 1 and the storage subsystem 10 are executed in accordance with the TCP/IP (Transmission Control Protocol/Internet Protocol) protocol. When a SAN is used, the host computer 1 and storage subsystem 10 perform data transfers in accordance with the Fiber Channel Protocol. Further, when the host computer 1 is a mainframe computer, data transfers are performed in accordance with a communication protocol such as FICON (Fibre Connection: registered trademark), ESCON (Enterprise System Connection: registered trademark), ACONARC (Advanced Connection Architecture: registered trademark), or FIBAR (Fibre Connection Architecture: registered trademark), for example.

Each host computer 1 is implemented as a server, personal computer, workstation, mainframe, or the like, for example. For example, each host computer 1 is connected to a plurality of client terminals located outside the figure via another communication network. Each host computer 1 provides each client terminal with services by writing and reading data to and from the storage subsystem 10 in accordance with requests from each client terminal, for example. Although only one is shown in the figure, a plurality of virtual enclosures (SLPR: Storage Logical Partition) can be established in the storage subsystem 10.

An SLPR is a region that is formed by partitioning and allocating a variety of physical resources and logical resources within the storage subsystem 10 to respective users (or to each application program). That is, the SLPRs are each provided with a dedicated channel adapter 20, a dedicated cache memory 40, a dedicated virtual logical device (VDEV) 70, and so forth, for example. That is, an SLPR acts as a virtual miniature storage subsystem.

An SLPR can be provided with at least one or more cache partition regions (CLPR: Cache Logical Partition). In FIG. 2, although only one SLPR is shown on the left-hand side, a plurality of SLPR can be provided. Further, one or a plurality of CLPR can be provided within one SLPR.

A CLPR logically partitions the cache memory 40 into a plurality of regions. The CLPR can be set for each channel adapter 20. For example, when n channel adapters 20 are mounted, n CLPR can be provided. For example, n can be set such that n=32 but the present invention is not limited to or by such a quantity. Each CLPR0 to CLPRn can be used independently and each host computer 1 can exclusively use only the CLPR that is available to each. Further, the constitution is such that manipulation of a certain CLPR by a host computer 1 affects another CLPR as little as possible. That is, even when access by a specified host computer 1 is intensive, the required cache capacity is secured only in the CLPR available to this host computer 1 so as not to deprive the resources of another CLPR (cache region).

Further, the CLPR0 shown on the right-hand side of the figure is a common region not defined by an SLPR. A variety of information used by the storage subsystem 10 as a whole is stored in this common region CLPR0. Further, as will be described subsequently, the whole region of the cache memory 40 is allocated to the common region CLPR0 in an initial state. Then, a new CLPR is established by taking a cache region of a predetermined capacity from the common region CLPR0.

In the example shown in FIG. 2, a host computer 1A is able to access only the common region CLPR0 to input and output data. A host computer 1B can access only CLPR1, the host computer 1C can access only CLPR2, and the host computer 1N can access only CLPRn, each being unable to use or reference any other CLPR.

An SVP (Service Processor) 90 is a computer device for managing and monitoring the storage subsystem 10, and so forth, and provides a management server function. The SVP 90 collects a variety of environment information, performance information, and so forth, from each channel adapter 20 and each disk adapter 30 via an internal network CN3 (see FIG. 3) such as a LAN provided within the storage subsystem 10, for example. Examples of information collected by the SVP 90 include the device constitution, a power supply alarm, temperature alarm, I/O speed (IOPS), and so forth. The SVP 90 and each of the management terminals 2A to 2N and 3 are connected via a communication network CN2 such as a LAN, for example. By logging on to the SVP 90 via a management terminal, an administrator is able, within the scope of his or her rights, to make RAID constitution settings, perform processing to close a variety of packages (channel adapter package, disk adapter package, memory package, disk drive and so forth), and perform various setting changes, and so forth, for example.

A plurality of management terminals 2A to 2N, and 3 can be connected to the SVP 90. Here, the management terminals 2A to 2N are terminals provided for each SLPR, and the management terminal 3 is a terminal that is provided in order to manage the storage subsystem 10 as a whole. The constitution is described in the following description by presenting a case where one CLPR is provided in one SLPR by way of example. Therefore, the management terminals 2A to 2N are subterminals operated by administrators (referred to as 'partition administrators' hereinafter) who manage each of the CLPR. The management terminal 3 is a master terminal that is operated by the system administrator (can also be referred to as the 'master administrator' hereinafter) who manages the storage subsystem 10 as a whole.

The partition administrator of each of the subterminals 2A to 2N is able to make a variety of setting changes only with respect to the CLPR for which he or she has administration rights, and is not allowed to reference or change the constitution and so forth of the other CLPR. On the other hand, the system administrator is able to make a variety of setting changes to the storage subsystem 10 as a whole, which include each CLPR.

The system administrator is able log onto the SVP 90 via the master terminal 3 to set the SLPR (CLPR) for each user by suitably partitioning the physical resources and logical resources that the storage subsystem 10 comprises. Further, the system administrator is able to issue a user ID or the like to each partition administrator. A partition administrator is then able to log on to the SVP 90 by using a dedicated user ID that is issued by the system administrator. The partition administrator is able to change the settings within the CLPR under his or her own management by operating the subterminal 2.

Figure 3:
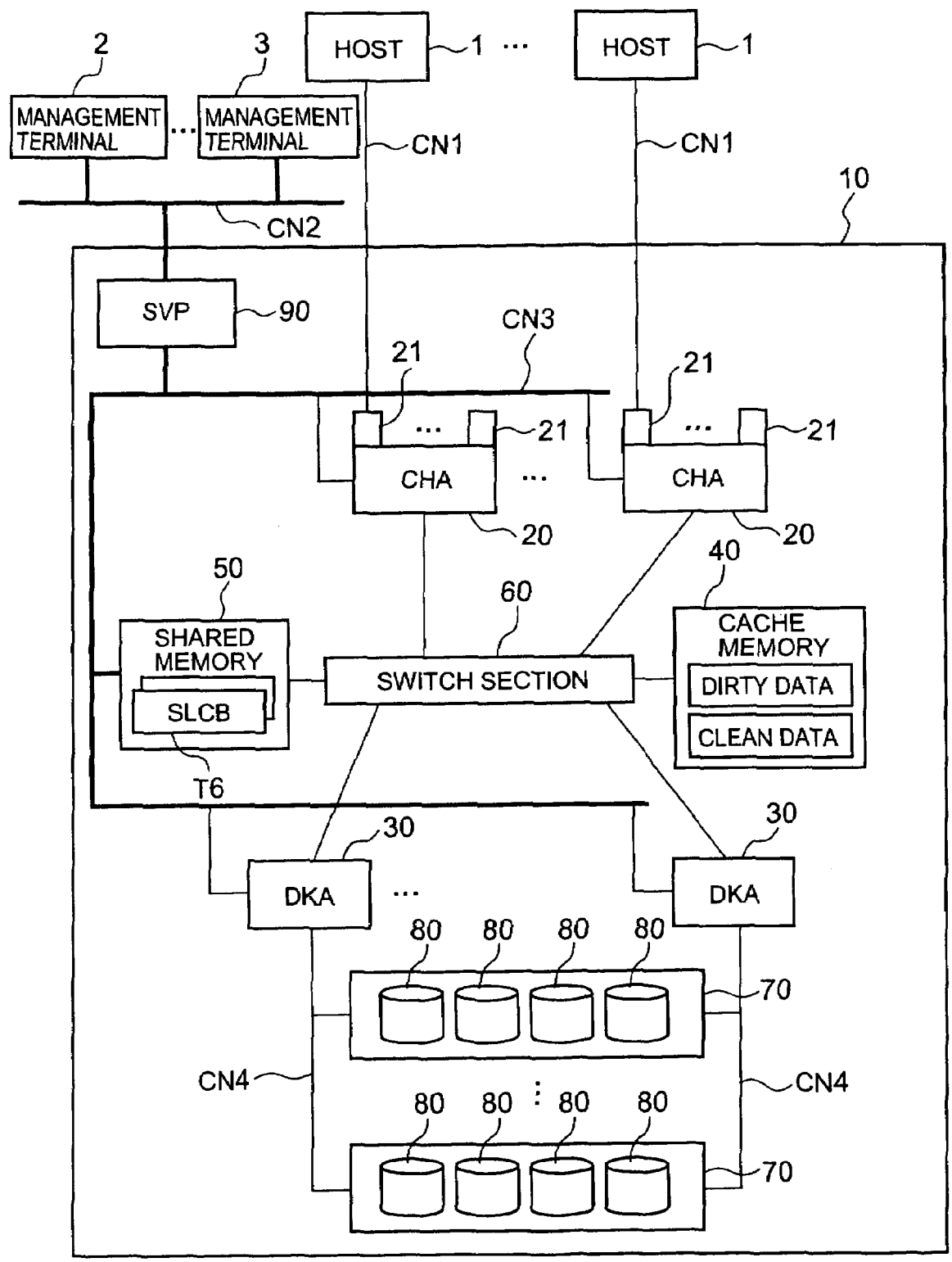
FIG. 3 is a more detailed block diagram of the storage subsystem.

FIG. 3 is a block diagram that focuses on the logical constitution of the storage subsystem 10. The storage subsystem 10 comprises a plurality of channel adapters (hereinafter 'CHA') 20, a plurality of disk adapters (hereinafter 'DKA') 30, at least one or more cache memory(ies) 40 and shared memory(ies) 50, a switch section 60, a plurality of virtual logical devices (VDEV) 70, a plurality of disk drives 80, and the SVP 90.

Each CHA 20 controls the data transfers with each host computer 1 and comprises a communication port 21. Thirty-two CHA 20, for example, can be provided in the storage subsystem 10. The CHA 20 are prepared in accordance with the type of host computer 1 as open-system CHA, mainframe-system CHA, and so forth, for example.

Each CHA 20 receives commands and data requesting data reading and writing from the host computer 1 connected to each CHA 20 and operates in accordance with the commands received from the host computer 1. If this is first described including the operation of the DKA 30, upon receiving a data read request from the host computer 1, for example, the CHA 20 stores the read command in the shared memory 50. The DKA 30 references the shared memory 50 as needed, and, upon discovering an unprocessed read command, reads data from the disk drive 80 and stores this data in the cache memory 40. The CHA 20 reads the data moved to the cache memory 40 and transmits the data to the host computer 1 from which the command was issued.

Upon receiving a data-write request from the host computer 1, the CHA 20 stores the write command in the shared memory 50. Further, the CHA 20 stores received data (user data) in the cache memory 40. Here, data from the host computer 1 that requires writing is 'dirty data' that has not been written to the disk drive 80, and hence is stored and combined in a plurality of locations, for example.

The CHA 20 stores data in the cache memory 40 and then reports writing completion to the host computer 1. The DKA 30 then reads the data stored in the cache memory 40 in accordance with the write command stored in the shared memory 50 and stores this data in a predetermined disk drive 80. The attribute of data written to the disk drive 80 changes from 'dirty data' to 'clean data' and is released from the multitask management of the cache memory 40. Further, in the present specification, 'dirty data' signifies data in the state of not being written to the disk drive 80. Further, 'clean data' signifies data that has been written to the disk drive 80.

A plurality, such as four, eight, or the like, for example, of each DKA 30 can be provided in the storage subsystem 10. Each DKA 30 controls the data communications between the disk drives 80. The DKA 30 and disk drives 80 are each connected via a communication network CN 4 such as a SAN, for example, and perform block-unit data transfers in accordance with the Fiber Channel protocol. Each DKA 30 monitors the state of the disk drive 80 as needed and the monitoring result is transmitted to the SVP 90 via an internal network CN 3. The CHA 20 and DKA 30 each comprise a print substrate mounted with a processor, memory, and so forth, and a control program (none is illustrated) stored in memory, for example, and implement predetermined functions by means of the collaborative work between the respective hardware and software.

The cache memory 40 stores user data and so forth, for example. The cache memory 40 is constituted by nonvolatile memory, for example. The cache memory 40 can be constituted by a plurality of memories and is able to carry out multitask management of dirty data. In this embodiment, each of CLPR0 to CLPRn is established by partitioning the whole cache region of the cache memory 40 into a plurality of regions.

The shared memory (or control memory) 50 is constituted by nonvolatile memory, for example. Control information, management information, and so forth, for example, are stored in the shared memory 50. This control information and other information can be subjected to multitask management by a plurality of shared memories 50. A plurality of the shared memory 50 and of the cache memory 40 can be provided. Further, the cache memory 40 and shared memory 50 can be mixed together and mounted on the same memory substrate. Alternatively, part of the memory can be used as a cache region while the other part can be used as a control region.

The switch section 60 connects each CHA 20, each DKA 30, the cache memory 40, and the shared memory 50 respectively. As a result, all the CHA 20 and DKA 30 are able to access the cache memory 40 and the shared memory 50. The switch section 60 can be constituted as an ultra high-speed crossbar switch or the like, for example.

A multiplicity of disk drives 80 can be mounted in the storage subsystem 10. Each disk drive 80 can be implemented as a hard disk drive (HDD), semiconductor memory device, and so forth. The disk drive 80 is a physical storage device (PDEV). Further, although different from a RAID constitution or similar, a virtual logical device (VDEV) 70 can be constructed in the physical storage region provided by a single set of four disk drives 80, for example. Further, a virtual logical device can be established above the VDEV 70. In addition, the storage resources used by the storage subsystem 10 need not all be provided within the storage subsystem 10, it being possible to use a storage region that exists outside the storage subsystem 10. For example, by allocating an external storage device that a storage subsystem by another manufacturer comprises to a specified VDEV 70 and managing the access path or the like to the storage device by the other manufacturer, the storage device by the other manufacturer can be used as if same were a home-company storage device.

Figure 4:
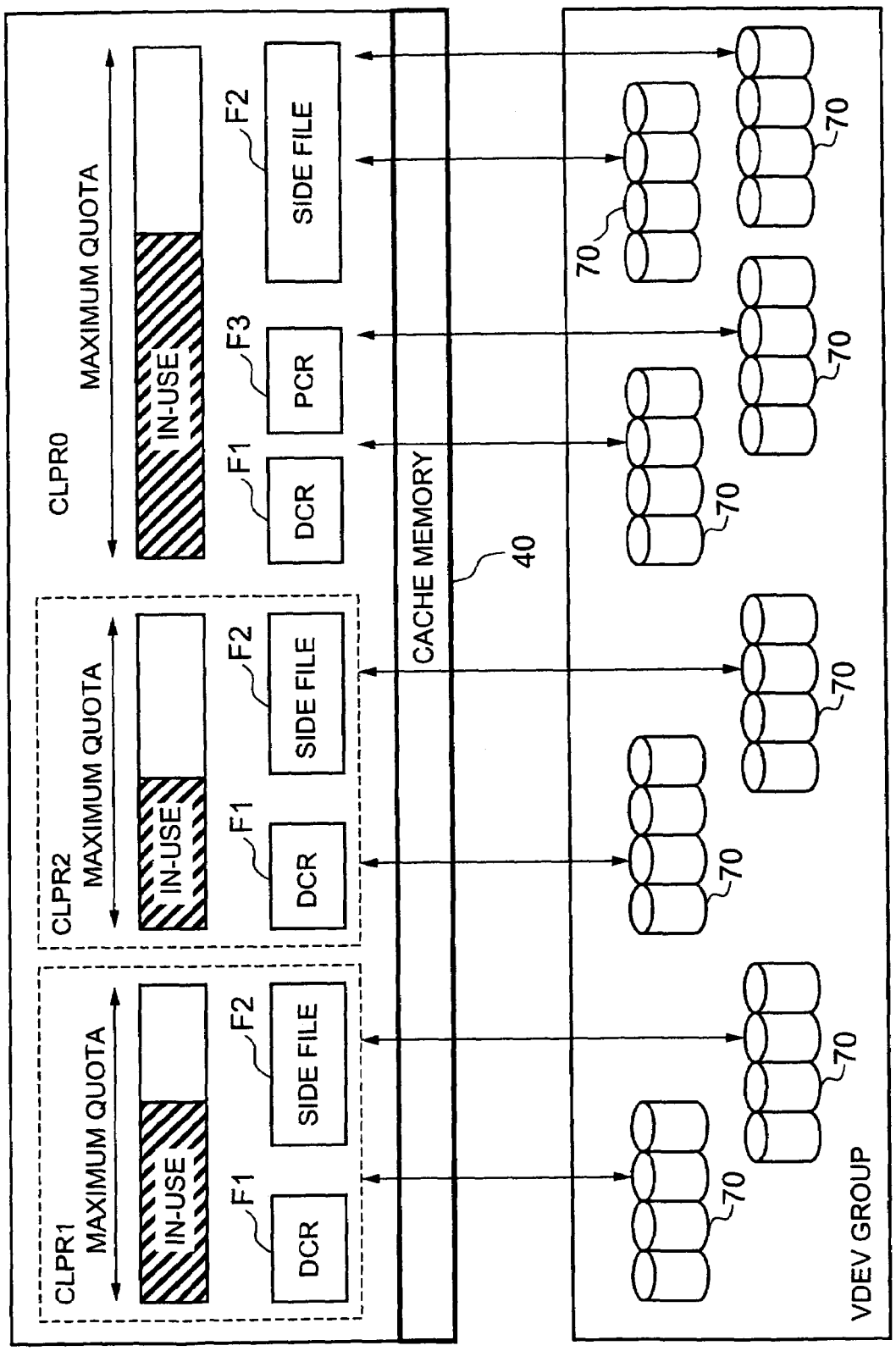
FIG. 4 is an explanatory view of the relationship between the cache regions allocated to each CLPR, and VDEV.

FIG. 4 is an explanatory view that schematically shows an aspect in which the resources of each CLPR are partitioned and used. This figure shows a case where the cache memory 40 is partitioned and used by the common region CLPR0 and two dedicated CLPR1, 2. Respective cache regions are allocated to each CLPR. The maximum value (maximum quota) of the cache region that can be used by each CLPR is set by the system administrator. Data used by the host computer 1 that uses each CLPR (write data, read data) is stored in the cache region allocated to each CLPR. In FIG. 4, oblique lines are drawn in regions where data is stored and these regions are labeled 'in use'. Each CLPR can use the cache region up to the maximum quota that each CLPR is able to use and is unable to use the cache regions of other CLPR.

In addition, each CLPR manages other cache-related data in addition the respective cache regions. Examples of cache-related data can include DCR (F1), side file F2, PCR (F3), for example.

DCR (Dynamic Cache Residency) 100 is a cache residency function, and allows data existing in specified regions of the VDEV 70 to reside in the cache region. As a result, the access performance with respect to an important data group can be increased.

The side file F2 is a file that stores data for transferring and copying data to a remote site (outside the figure). For example, when remote-copy-target data accumulates in a predetermined quantity or more in the side file F2, data is transferred to and stored in a separate storage subsystem in a location some distance away. In the initial copying involved in the remote copying, a designated data group is copied in its entirety to the remote site and data that is subsequently updated is copied remotely as a differential file.

A PCR (Partical Cache Residence) 102 is used in a case where a NAS (Network Attached Storage) function is provided in the storage subsystem 10, for example, and is a function that allows data residency in the cache region for each data type. Although the DCR(F1) provides residency for data existing between specified storage spaces, the PCR (F3) grants residency to data of a specified type. Further, the cache-related data DCR (F1), side file F2 and PCR (F3) are provided only in the CLPR that require this data. That is, data related to cache residency is not stored in a CLPR for which the residency function has not been set. Similarly, the side file F2 is not stored in a CLPR for which remote copying has not been established.

Further, as shown in FIG. 4, at least one or more VDEV 70 is(are) allocated to each CLPR. Data that is written to the cache region of each CLPR is written to predetermined regions of the VDEV 70 that have been allocated to each of these data. Further, the data read from the VDEV 70 is stored in the cache region of the corresponding CLPR.

Figure 5:
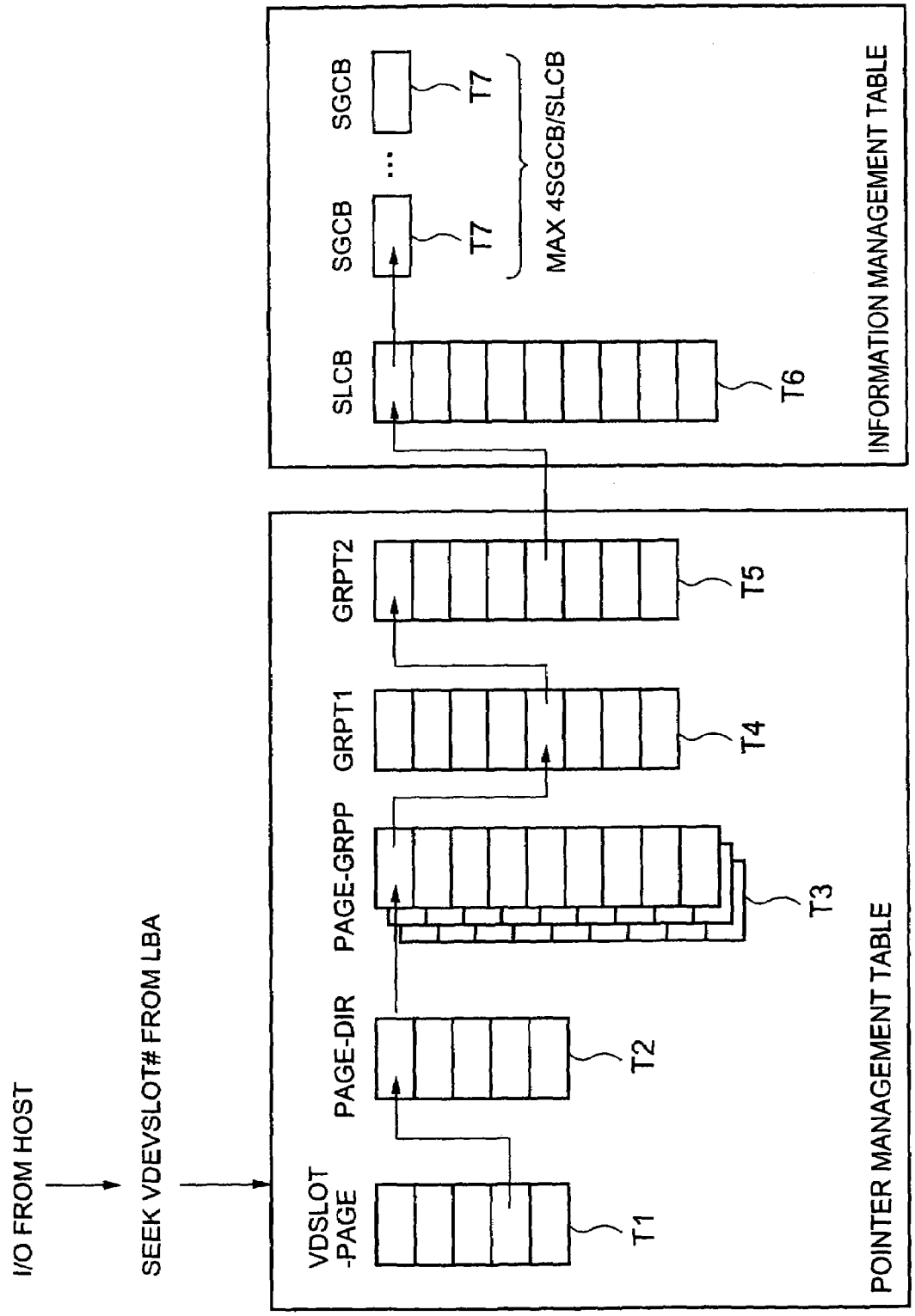
FIG. 5 is an explanatory view of a cache management method with a hierarchical structure.

FIG. 5 is an explanatory view of the method for managing the data stored in the cache memory. In order to efficiently search for data stored in the cache memory 40, the storage subsystem 10 manages this data by means of the hierarchical structure described below.

First, in the event of a data I/O request from the host computer 1, a VDEVSLOT number (VDEVSLOT#) is requested based on the LBA (Logical Block Address) contained in the I/O request. Then, based on the VDEVSLOT number, a pointer to the next level is acquired by referencing a VDSLOT-PAGE table T1. A pointer to the PAGE-DIR table T2 is contained in the VDSLOT-PAGE table T1. A pointer to the PAGE-GRPP table T3 is contained in the PAGE-DIR table T2. In addition, a pointer to the GRPT1 table T4 is contained in the PAGE-GRPP table T3. A pointer to the GRPT2 table T5 is contained in the GRPT1 table T4, and a pointer to the SLCB (slot control table) T6 is contained in the GRPT2 table T5.

Thus, by referencing each of the tables T1 to T5 in order, based on the LBA, the SLCB table T6 is reached. At least one or more SGCB (segment control block) table(s) T7 is (are) associated with the SLCB table T6. The SGCB table(s) T7 store(s) control information related to the segment that is the minimum unit for cache management. One to four segments can be associated with a single slot. 48 KB or 64 KB data, for example, can be stored in one segment.

The minimum unit of cache management is the segment, but the transition between the respective states of dirty data (state prior to writing to a physical disk) and clean data (state after writing to the physical disk) is executed in slot units. Further, the securing (reserve) and freeing (release) of cache regions is also performed in slot units or segment units.

Figure 8:
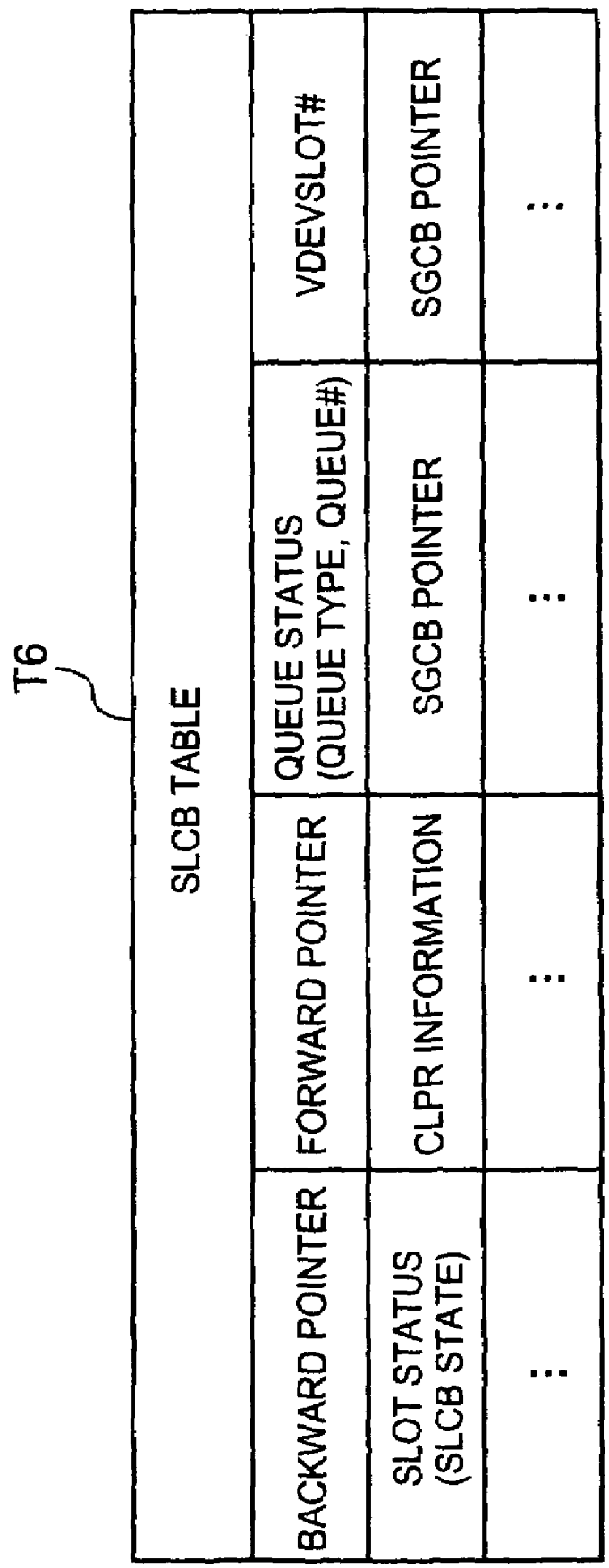
FIG. 8 is an explanatory view of the overall structure of the SLCB table.

As shown in FIG. 8, the SLCB table T6 can be constituted containing a backward pointer, a forward pointer, queue status, VDSLOT#, slot status, CLPR information, and at least one or more SGCB pointers. The queue status includes the queue type associated with the SLCB table T6 and the queue number. The slot status includes the state of the slot corresponding to the SLCB table T6. The CLPR information includes information (CLPR number or the like) relating to the CLPR to which the SLCB table T6 belongs. The SGCB pointer includes a pointer for specifying the SGCB table T7 associated with the SLCB table T6.

Further, the SLCB table T6 and SGCB table T7 perform exclusive control in VDEV 70 units so that integrity is not lost due to the generation of a pointer-change conflict, for example. That is, the SLCB table T6 or SGCB table T7 can be manipulated only when a lock is acquired for the VDEV 70 to which the SLCB table T6 or SGCB table T7 belongs. In this specification, this VDEV-unit exclusive control is known as 'VDEV lock'. VDEV lock can also be expressed as exclusive control in logical volume units.

Figure 6:
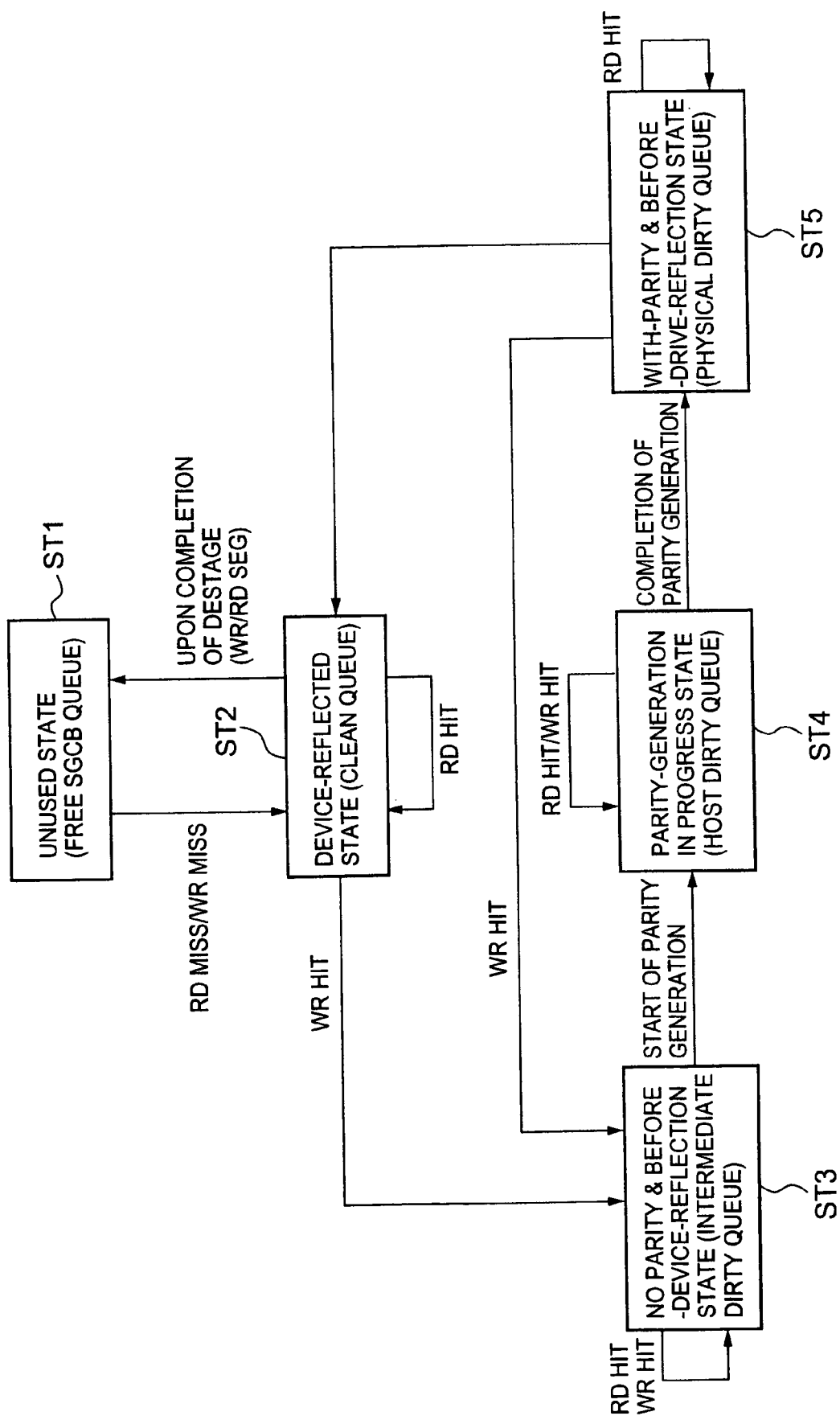
FIG. 6 is an SLCB-table state transition diagram.

FIG. 6 is an explanatory view of the state transitions of SLCB table T6. The SLCB table T6 is able to capture five statuses, which are, for example, unused state ST1, device-reflected state ST2, no-parity & before-device-reflection state ST3, parity-generation in-progress state ST4, and with-parity & before-drive-reflection state ST5.

Unused state ST1 is a state indicating that the slot is unused. A slot (SLCB) in an unused state is managed by means of a free SGCB queue (abbreviated to 'free queue' hereinafter). Device reflected state ST2 is a state indicating that the data stored in the slot has been written to a physical device (disk drive 80). A slot in device-reflected state ST2 is managed by means of a clean queue.

No-parity & before-device-reflection state ST3 is a state that indicates that parity data has not yet been generated for data stored in the slot when parity data is required as per RAID5 or similar, for example. A slot in the no-parity & before-device-reflection state ST3 is managed by means of an intermediate dirty queue. Parity-generation in-progress state ST4 is a state indicating that the generation of parity data for the data stored in the slot is underway. A slot in the parity-generation in-progress state ST4 is managed by means of a host dirty queue.

With-parity & before-drive-reflection state ST5 is a state that indicates that parity data has been generated for the data stored in the slot but has not yet been written to a physical device. A slot in the with-parity & before-drive-reflection state ST5 is managed by means of a physical dirty queue (hereinafter abbreviated to 'dirty queue').

In the event of write access by a host computer 1, the state makes the transition from ST1 to ST3 via ST2 and the generation of parity data begins. Next, when parity data is generated for data requiring writing, the state changes from ST3 to ST5 via ST4. When data has (have) been written from the host computer 1 to one or a plurality of slots of the CLPR cache region, a writing completion report is transmitted to the host computer 1. At this point, the data requiring writing exists only in the cache region and thus enters the dirty state (ST5).

Further, when data of a slot in the dirty state is written to a predetermined physical device (destage), the slot changes from the dirty state to the clean state (ST5 to ST2). The data in the clean state is written to a physical device and hence may be erased from the cache region if necessary. When data stored in a slot in the clean state is erased from the cache, the slot is restored from the clean state to the unused state (ST2 to ST1).

In the event of read access by the host computer 1, required data is specified by following, in order, each of the level tables T1 to T6 mentioned together with FIG. 5. Further, data required by the host computer 1 is read from a physical device and stored in one or a plurality of slots in the cache region. The slot(s) that store(s) the data thus read from the physical device is (are) in the clean state.

Figure 7:
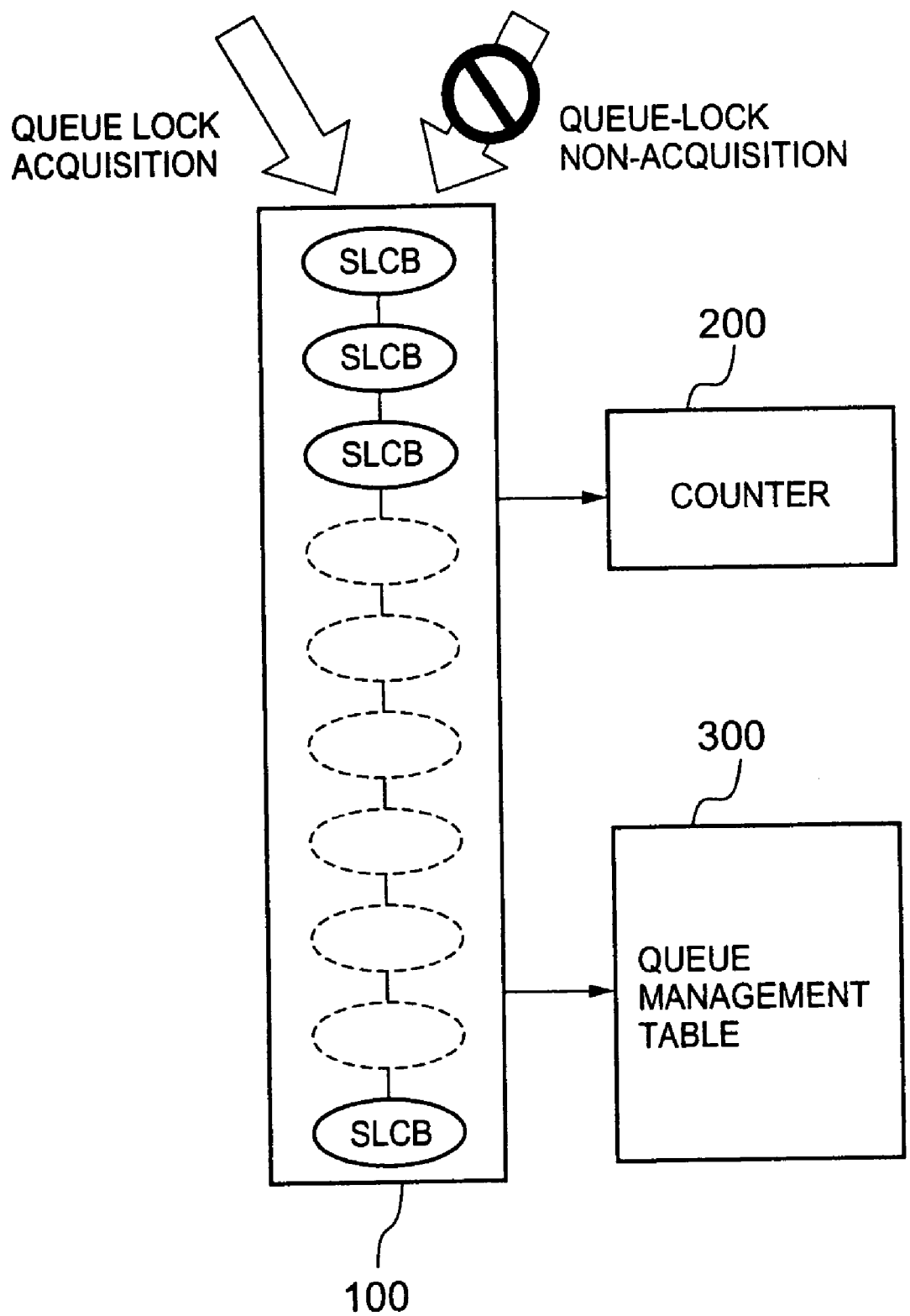
FIG. 7 is an explanatory view of the relationships between the queue, counter, and queue management table.

FIG. 7 is an explanatory view of the queue structure. The queue 100 is constituted as a queue that links the SLCB table T6 in the same state in one direction or in both directions. When the state of the SLCB table T6 changes, the constitution of the queue 100 changes on the basis of a preset algorithm such as a FIFO (First-In First-Out) or LRU (Least Recently Used) algorithm, for example.

In order to prevent loss of integrity due to a conflict in the manipulation of the SLCB table T6, exclusive control is performed for each queue 100. That is, this queue can be manipulated only when a manipulation-target queue lock is acquired. In this specification, this queue-unit exclusive control is known as a 'queue lock'. Therefore, the SLCB table T6 can be manipulated under the two-stage exclusive control of the above-mentioned VDEV lock and queue lock. In other words, the content of the SLCB table T6 can be changed only when two locks, which are the VDEV 70 lock to which the SLCB table T6 to be manipulated belongs, and the queue lock to which the SLCB table T6 is connected, are acquired.

Therefore, a plurality of queues of the same type are provided with the overhead during lock acquisition in mind in order to provide exclusive control of manipulation of the queue 100. The clean queue, dirty queue and free queue, and so forth, are each constituted by a plurality of queues.

A counter 200 is associated with individual queues that constitute a queue set. The counter 200 manages the quantity of SLCB tables T6 and SGCB tables T7 that belong to the queues. The overload control and so forth described subsequently can be executed on the basis of the number of SLCB, and so forth, managed by the counter 200.

Further, a queue management table 300 is also associated with the individual queues 100 constituting the queue set. The queue management table 300 manages the structure and so forth of the queue 100. The queue 100, counter 200, and queue management table 300 are each stored in the shared memory 50.

Figure 9:
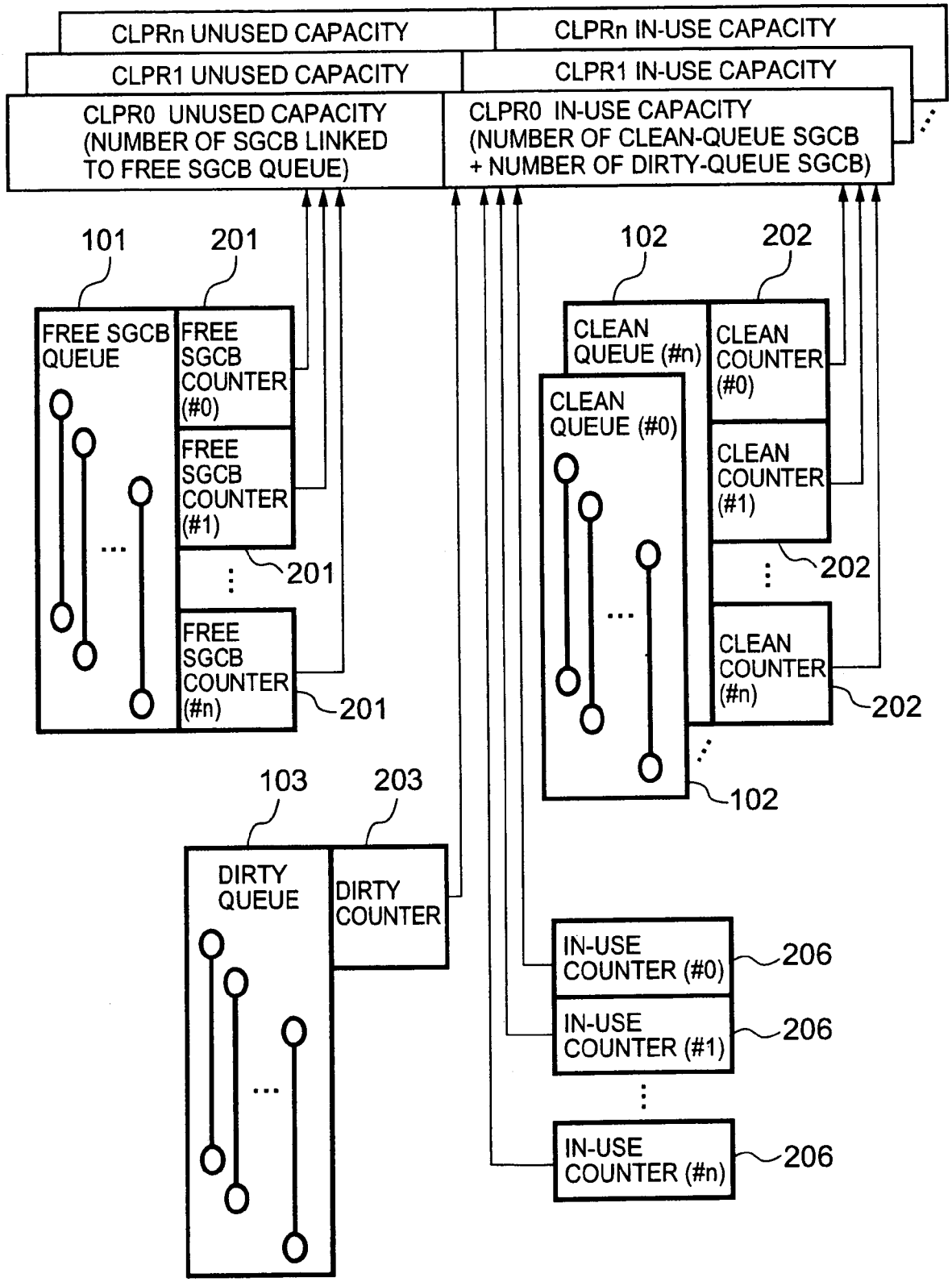
FIG. 9 is an explanatory view of the relationships between cache regions and each queue and counter.

FIG. 9 is an explanatory view that schematically shows the relationships between each queue and the usage state of the cache region of each CLPR. Each CLPR cache region can be divided into 'in-use regions' and 'unused regions' in accordance with the usage state. An in-use region signifies a slot group (segment group) that stores data. An unused region signifies a vacant slot group (segment group).

A value found by multiplying the total number of segments being used by the data size per segment is the size of the in-use region of the CLPR. Segments being used include segments in the clean state and segments in the dirty state. Therefore, the region size that is currently being used in the cache region allocated to the CLPR can be expressed by: (the number of clean-state segments+the number of dirty-state segments). The size of the unused region can be expressed by the number of segments in the free state.

A free queue 101 manages the SLCB table T6 in the free state (unused state). The number of SLCB tables T6 (and SGCB tables T7) connected to the free queue 101 can be determined by a free counter 201 associated with the free queue 101. The control unit of the free queue 101 is the VDEV and the queue-lock unit is also a VDEV unit. Further, the free queue 101 is used in accordance with FIFO, for example. The free queue 101 is provided in a quantity that is two times the mount number of VDEV 70, for example. Therefore, supposing that the maximum number of mountable VDEV 70 is 512, the total number of free queues 101 is then 1024.

A clean queue 102 manages SLCB management tables T6 in the clean state. The number of SLCB tables T6 (and SGCB tables T7) connected to the clean queue 102 is determined by the clean counter 202 associated with the clean queue 102. The control unit of the clean queue 102 is VDEV and the queue-lock unit is also the VDEV unit. The clean queue 102 is used in accordance with LRU, for example. The clean queue 102 is provided in a quantity that is four times the mount number of VDEV 70 (512×4=2048), for example.

The dirty queue 103 manages SLCB management tables T6 in the dirty state. The number of SLCB tables T6 (and SGCB tables T7) connected to the dirty queue 103 is determined by the dirty counter 203 associated with the dirty queue 103. The control unit of the dirty queue 103 is the physical drive. The dirty queues 103 are provided in a quantity that is thirty-two times the mount number of disk drives 80, for example. When 2048 disk drives 80 are mounted, 65536 dirty queues 103 can be provided. The dirty queue 103 serves to manage data (segments) before same are written to a physical device. Therefore, the association is deeper with a physical device (disk drive 80) than with a logical device (VDEV 70). Therefore, the dirty queues 103 are set depending on the number of physical devices.

An in-use counter 206 counts the number of segments in use (the number of segments in the dirty state+the number of segments in the clean state) in each CLPR.

Figure 10:
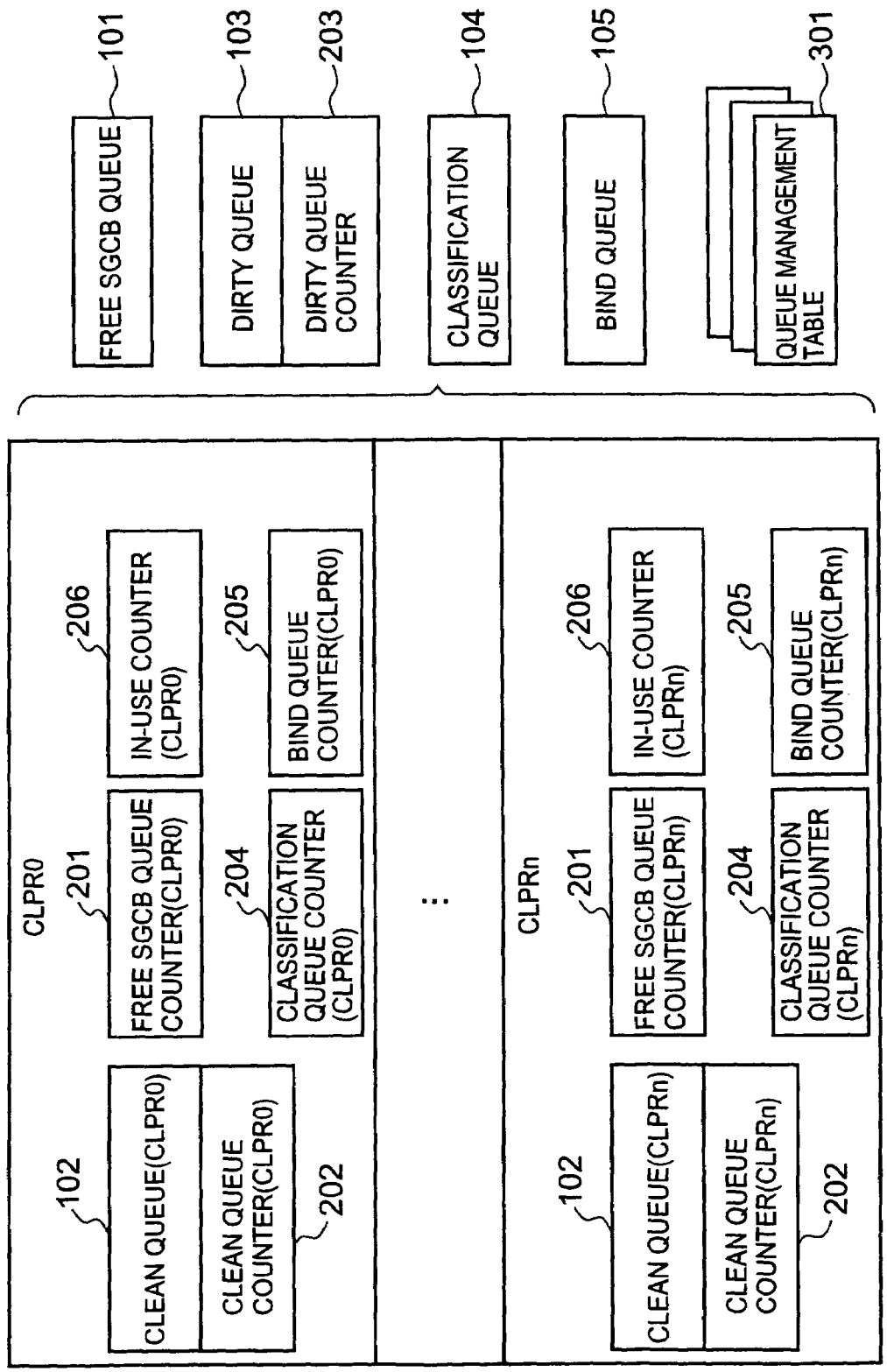
FIG. 10 is a schematic view of an aspect in which CLPR management information is allocated.

FIG. 10 is an explanatory view of the relationship between each CLPR, and each queue and counter, and so forth. Each of the queues, counters and management tables constitutes management information for managing a queue management unit (segment or slot). In this embodiment, management information (partition management information) provided for each CLPR and common management information that applies to all the CLPR are distinguished in accordance with the property (status) of the segment or slot.

As shown in FIG. 10, each CLPR is provided with the clean queue 102, the clean counter (more accurately speaking, a clean queue counter) 202, the free queue counter 201, a classification queue counter 204, the in-use counter 206, and a BIND queue counter 205. Further, although omitted from the illustration, a clean queue management table for managing the constitution of the clean queue 102 is also provided for each CLPR. As described above, management information provided for each CLPR constitutes partition management information.

On the other hand, the free queue 101, dirty queue 103, dirty counter (more accurately speaking, a dirty queue counter) 203, a classification queue 104, a BIND queue 105, and a queue management table 301 for managing each of these queues 101, 103 to 105 constitutes common management information that is applied jointly to all the CLPR.

The classification queue 104 is a queue for managing data that is allowed to reside in the cache region according to the PCR function. The classification queue counter 204 counts the number of segments allowed to reside by means of the PCR.

The BIND queue 105 is a queue for managing data that is allowed to reside in the cache region in accordance with the DCR function. The BIND queue counter 205 counts the number of segments (or the number of slots) that are allowed to reside by means of DCR.

By providing the classification queue 104 and BIND queue 105 for managing the segments storing the resident data respectively, it is possible to prevent segments storing data that is to reside in each CLPR from being changed to the free state.

Next, the grounds for providing any of the submanagement information items (queues, counters, queue management tables) constituting management information in each CLPR or for applying any of these information items to all the CLPR will be explained.

The clean queue 102, clean counter 202 and clean queue management table are provided for each CLPR. When the segments in the free state are depleted, clean-state slots are freed and changed to free slots. Therefore, the clean queue 102 is a queue with the highest usage frequency. Moreover, in cases where a one-set clean queue is used in all the CLPR, when depletion of the free segments arises in a certain CLPR, there is the possibility that a clean-state slot for storing data used by another CLPR will be freed. In other words, the cache usage state of one CLPR affects the cache usage state of another CLPR. Therefore, in this embodiment, the clean queue 102, and clean counter 202 can be provided in each CLPR. Further, the queue management table is handled integrally with the queue. Hence, in cases where the clean queue 102 is provided in each CLPR, the clean queue table is also provided in each CLPR.

The in-use counter 206 is provided in each CLPR. The in-use counter 206 counts values obtained by adding the number of clean-state segments to the number of dirty-state segments. Accordingly, a value obtained by subtracting the count value of the clean counter 202 from the count value of the in-use counter 206 is none other than the number of segments in the dirty state in the CLPR. Therefore, if the clean counter 202 and the in-use counter 206 are provided for each CLPR, the dirty counter 203 need not be provided in each CLPR.

The dirty queue 103 is a queue associated with a physical device and the control unit is also the physical device unit. Therefore, if, in a case where the dirty queue 103 is provided for each CLPR, the storage capacity for storing the dirty queue management table increases, the storage region of the shared memory 50 is compressed. For example, the amount of information required per queue is 16 bytes for the queue management table and 4 bytes for the counter. Queue partitioning signifies the partitioning of the queue management table and hence multiple storage regions of the shared memory 50 are consumed for the storage of partition management information. Therefore, in this embodiment, the dirty queue 103 and dirty counter 203 are not provided for each CLPR but are instead applied to all the CLPR in order to make efficient usage of the storage resources of the shared memory 50.

Furthermore, from the perspective of effectively utilizing the storage resources of the shared memory 50, the free queue 101 is not provided for each CLPR either and only the free counter 201 with a small number of bytes is provided in each CLPR.

For reasons similar to those with respect to the free queue 101, only the classification queue 104, the BIND queue 105 and the respective counters 204, 205 thereof are provided for each CLPR, the queues themselves being applied to all the CLPR.

Therefore, in this embodiment, submanagement information is allocated in accordance with the attributes of the submanagement information, that is, in accordance with the attributes of the queue management units managed by the submanagement information. Therefore, the storage resources of the shared memory 50 can be efficiently used and independence between the CLPR can be secured.

Figure 11:
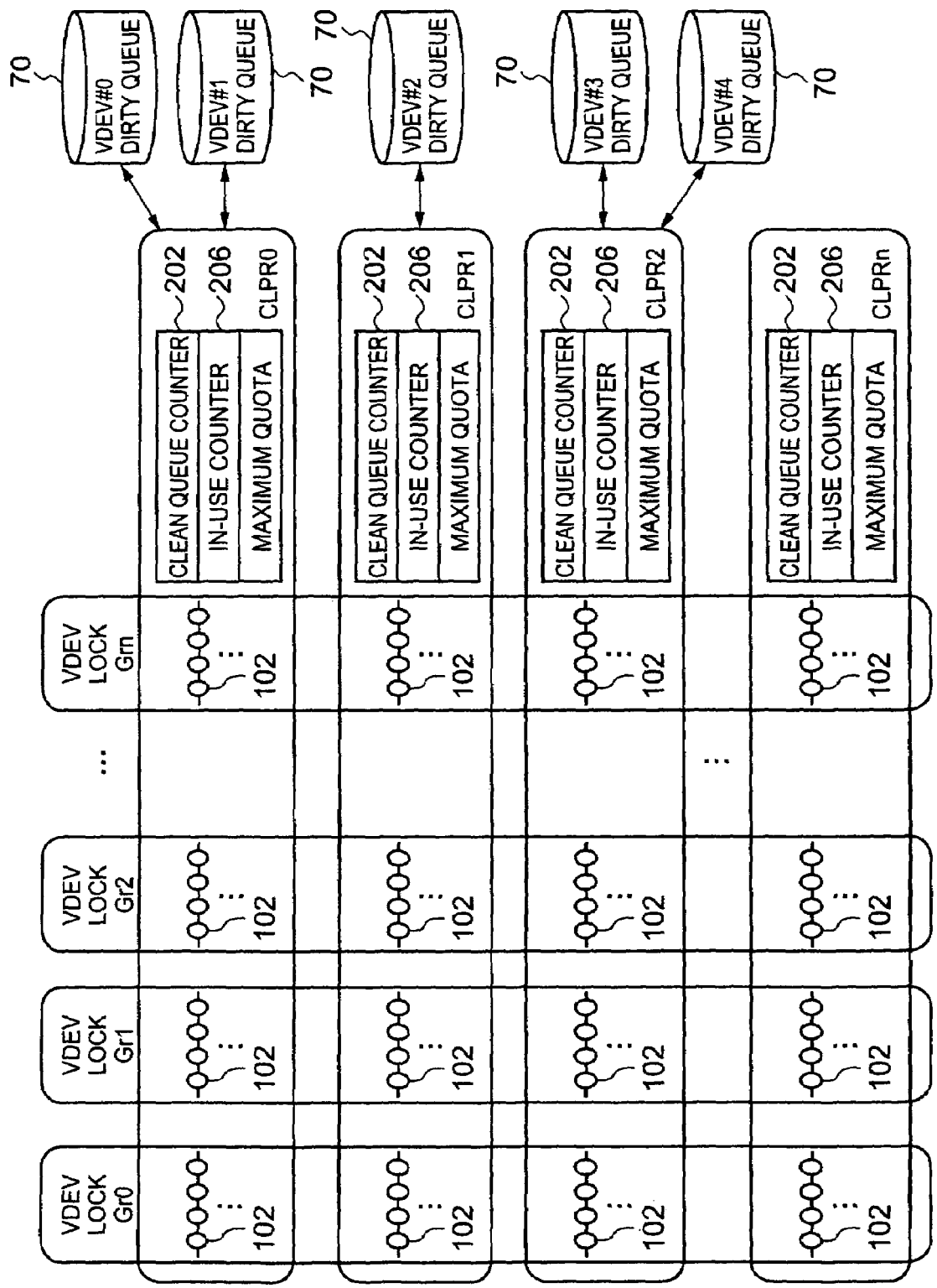
FIG. 11 is an explanatory view of an aspect in which the movement of data is permitted by means of VDEV locks and queue locks.

FIG. 11 is an explanatory view of the relationship between the queue management structure and exclusive control. In FIG. 11, only part of the management information described together with FIG. 10 is shown. 'VDEV lock Gr' in FIG. 11 indicates a VDEV lock group. The VDEV lock must be acquired in order to manipulate the directory, and manipulation of the queue lock is necessary in order to manipulate the queue. That is, in order to move the data managed by the CLPR, rights for manipulating the queue managing the segments that store the data, and rights for manipulating the directory to which the segment belongs are required.

Figure 12:
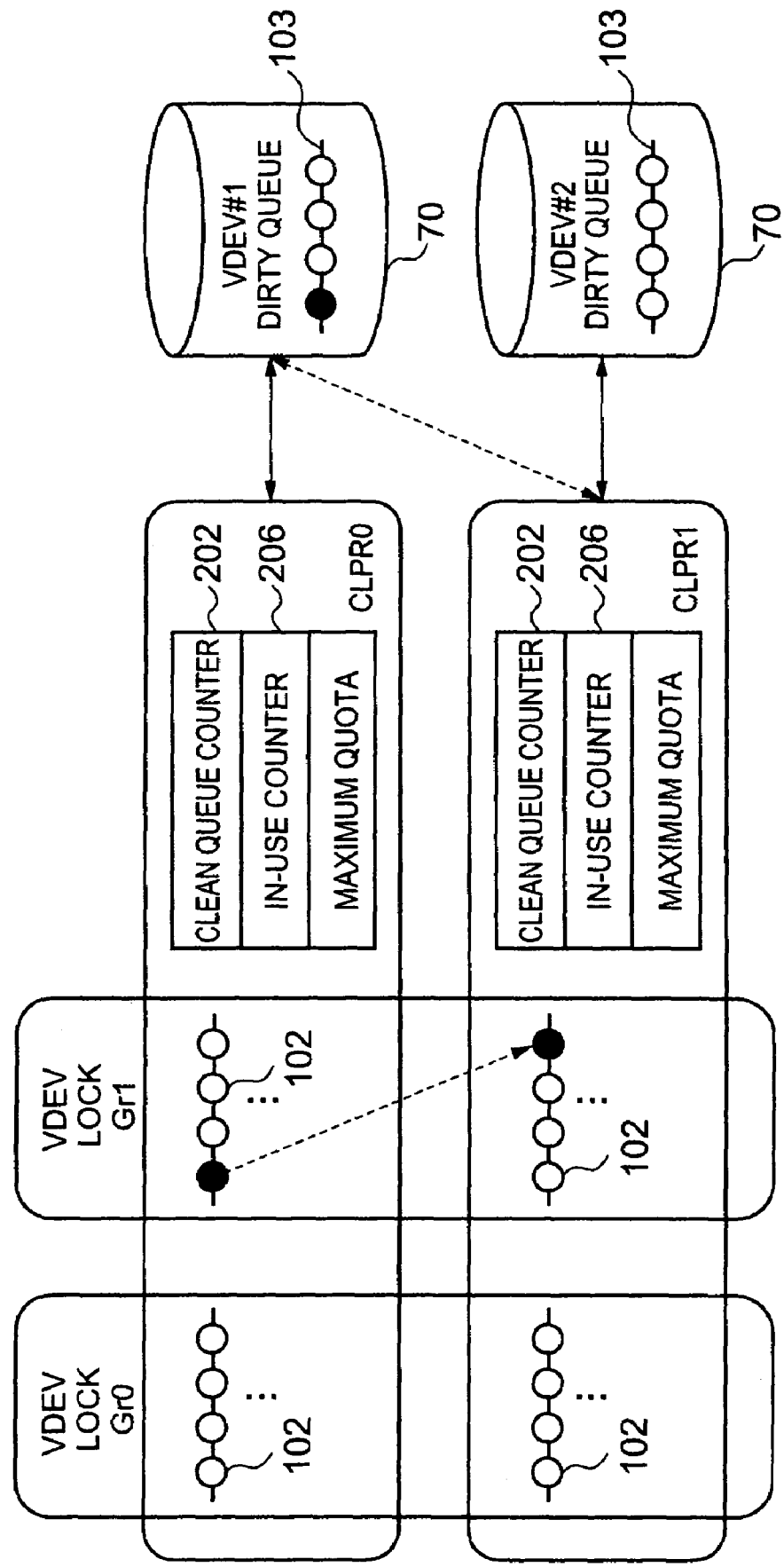
FIG. 12 is an explanatory view of an aspect in which a VDEV is moved from CLPR0 to CLPR1.

As shown on the right-hand side of the FIG. 11, one or a plurality of VDEV 70 can be associated with each CLPR. A VDEV 70 associated with a certain CLPR can also be associated with a separate CLPR. FIG. 12 is an explanatory view of an aspect, in which VDEV #1, which is associated with CLPR0, is switched to CLPR1.

When the destination CLPR to which the VDEV 70 is to belong is changed, the association between the VDEV 70 and the CLPR is changed, and the data group belonging to the movement-target VDEV 70 must be associated with the new CLPR. That is, the movement-target segment (or slot) is removed from the queue associated with the movement-origin CLPR and then connected to the queue associated with the movement-destination CLPR. When this operation is performed, both the VDEV lock and the queue lock are required.

Figure 13:
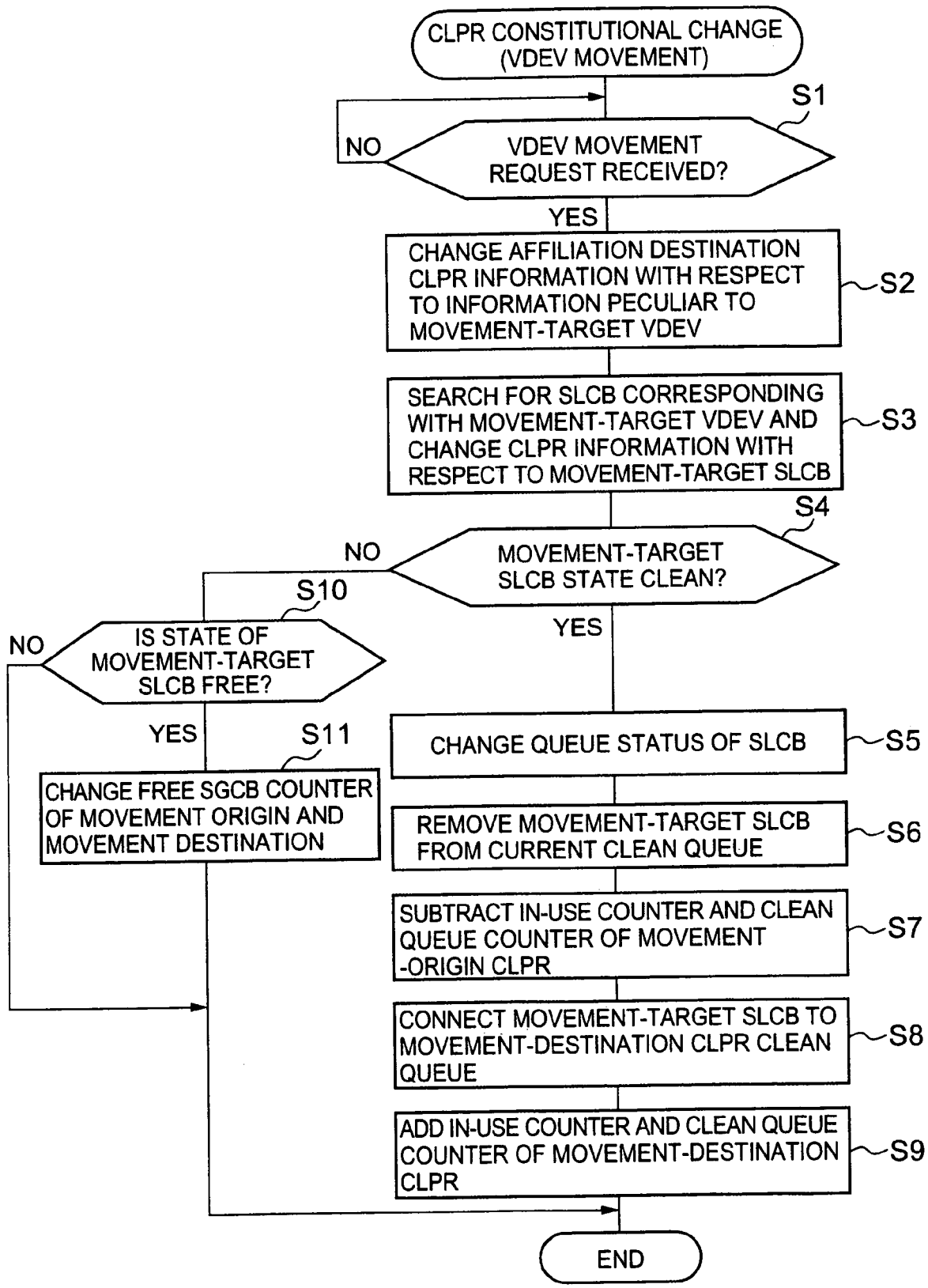
FIG. 13 is a flowchart showing processing in a case where a VDEV is moved.

FIG. 13 shows an example of processing in a case where the constitution of the CLPR is changed. FIG. 13 shows an outline of a case where a VDEV 70 associated with the movement-origin CLPR is moved to the movement-destination CLPR.

First, when the system administrator requests movement of the VDEV 70 via the management terminal 3 (S1:YES), the representative processor of the CHA 20 and DKA 30 and so forth changes the information peculiar to the VDEV 70 designated as the movement target (S2). That is, information relating to the CLPR to which the VDEV 70 belongs (affiliation destination CLPR information) is rewritten with information relating to the movement destination CLPR.

Next, the representative processor searches for and extracts the SLCB table T6 corresponding with the movement-target VDEV 70 and changes the CLPR information for the SLCB table T6 that is to be the movement target (S3). That is, as mentioned together with FIG. 8, information relating to the affiliation-destination CLPR is changed to information relating to the movement-destination CLPR for each SLCB table T6 that is to be the movement target.

The representative processor then performs a scan of whether or not the slot status of the movement-target SLCB table T6 is in the clean state (S4). When the slot is in the clean state (S4: YES), that is, when the movement-target SLCB table T6 is connected to the clean queue 102, the representative processor changes the queue status of the SLCB table T6 in accordance with the movement-destination CLPR (S5). That is, information on which number of clean queue 102 provided in the movement-destination CLPR is connected to, and so forth, is rewritten.

After changing the queue status, the representative processor removes the movement-target SLCB table T6 from the current clean queue 102 (S6). Next, the representative processor reduces the count values of the in-use counter 206 and clean counter 202 provided in the movement-origin CLPR in accordance with the number of clean slots moved (S7). Subsequently, the representative processor connects the movement-target SLCB table T6 to the clean queue 102 of the movement-destination CLPR (S8). The representative processor then increases the respective count values of the in-use counter 206 and the clean counter 202 of the movement-destination CLPR (S9) and ends the processing.

On the other hand, when the SLCB table T6 corresponding with the movement-target VDEV 70 is not in the clean state (S4:NO), the representative processor performs a scan to determine whether the movement-target SLCB table T6 is in the free state (S10). When the movement-target SLCB table T6 is indeed in the free state (S10:YES), the representative processor changes the movement-origin and movement-destination free counters 201 (S11). That is, the representative processor subtracts the movement-origin free counter 201 in accordance with the number of free slots moved, adds the movement-destination free counter 201, and then ends the processing. When the movement-target SLCB table T6 is in the dirty state (S10: NO), the processing is ended regardless. The dirty queue 103 and dirty counter 203 are applied jointly to all the CLPR and, hence, queue movement and counter increases and reductions are not required.

Further, although not illustrated in FIG. 13, the SLCB tables T6 connected to the classification queue 104 and BIND queue 105 are processed similarly to the free queue 101. The classification queue 104 and BIND queue 105 are not provided partitioned for each CLPR, only the respective counters 204 and 205 thereof being provided for each CLPR. Therefore, movement between queues does not occur and only a change in the counter value arises between the movement origin and movement destination.

Figure 14:
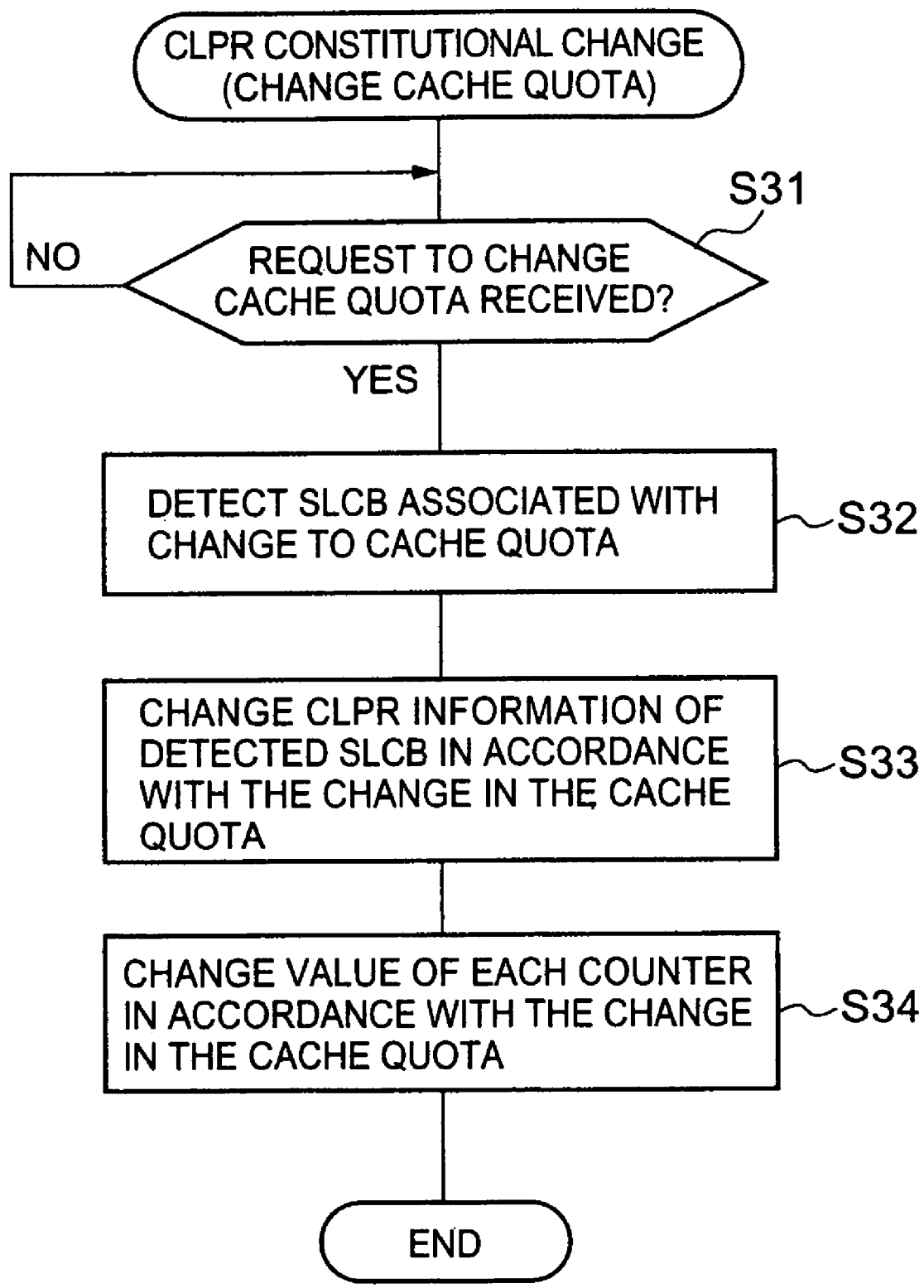
FIG. 14 is a flowchart for a case where the cache allocation for a CLPR is changed.

FIG. 14 is a flowchart that shows outline processing for a case where the CLPR cache quota is changed. When a change operation for the cache allocation processing by the system administrator is performed (S31: YES), the representative processor detects the SLCB table T6 associated with the change in cache allocation (S32). Next, the representative processor modifies the CLPR information of the SLCB table T6 associated with the change is changed in accordance with the change in cache allocation (S33).

For example, when the CLPR1 cache quota is reduced and the cache quota of the CLPR2 is increased to the same extent, the affiliation destination CLPR of the SLCB table T6 located in the fluctuating region is changed from CLPR1 to CLPR2. The value of the clean counter 202 or similar is then increased and reduced in accordance with the change in the cache-region allocation and the processing is ended (S34).

Figure 15:
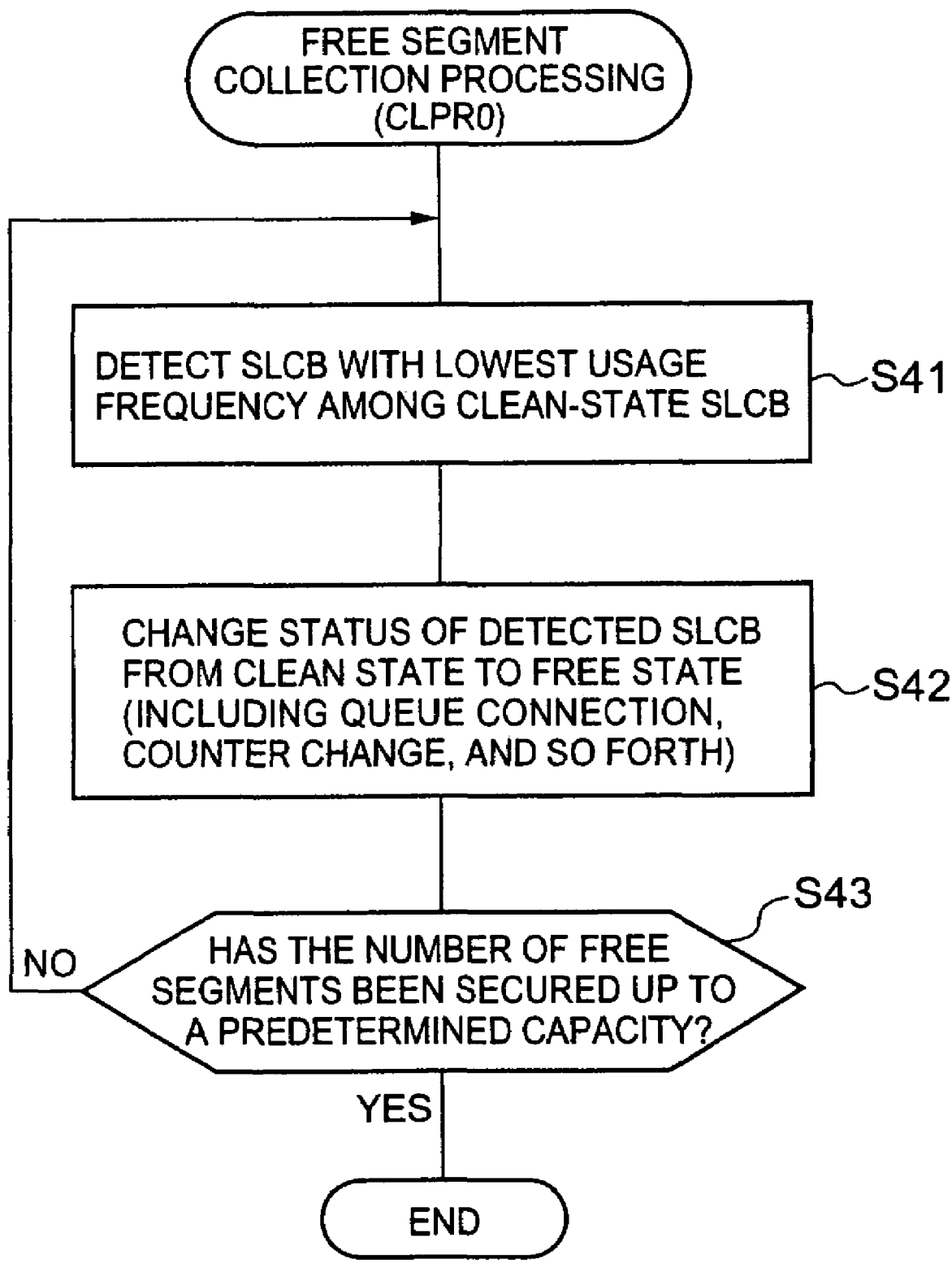
FIG. 15 is a flowchart showing free-segment collection processing.

FIG. 15 is a flowchart showing an outline of the free segment collection processing for securing free segments. Here, a free segment signifies a segment in the free state. This processing can be executed at regular intervals or in the event of a shortage of free segments (an overload).

First, the SLCB table T6 with the lowest usage frequency is detected among the clean-state SLCB tables T6 (S41), and the status of the SLCB table T6 thus detected is changed from the clean state to the free state (S42). In accordance with this status change, the SLCB table T6 is switched from the clean queue 102 to the free queue 101. Further, the respective count values of the clean counter 202 and the free counter 201 are changed. The processing of S41 and S42 is repeated until a free segment of a predetermined capacity is secured (S43).

FIG. 16 is a schematic view of an aspect in which the CLPR is defined. In this embodiment, the CLPR0 is used as a common pool region. A variety of information that is used jointly in the storage subsystem 10 is stored in the CLPR0. As mentioned earlier, a variety of management information is stored in the shared memory 50.

Figure 16A:
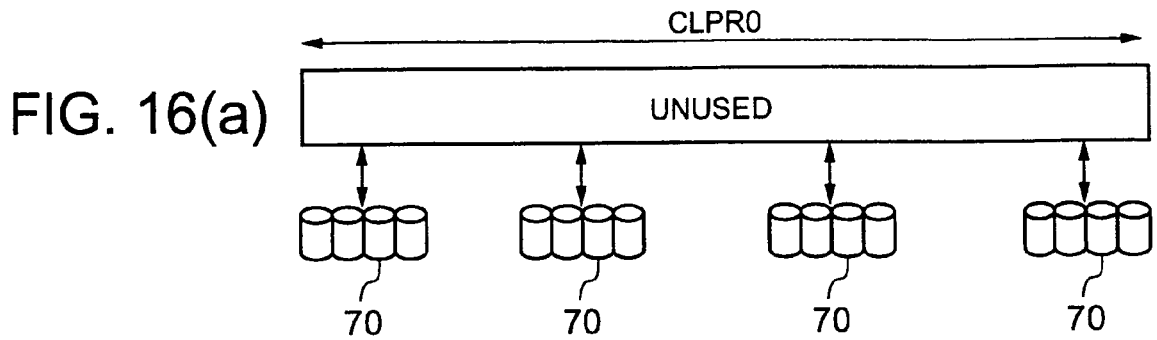
FIG. 16 is an explanatory view of an aspect in which a new CLPR is set by taking a cache region from CLPR0, which is used as a pool region.
Figure 16B:
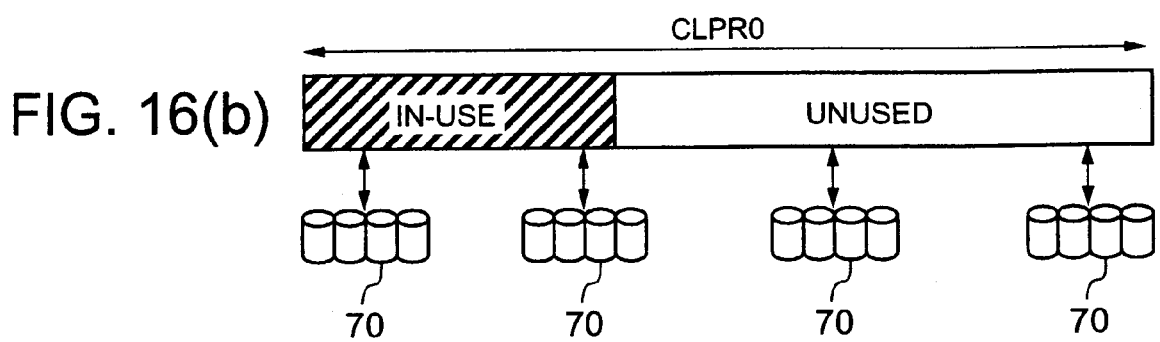
Figure 16C:
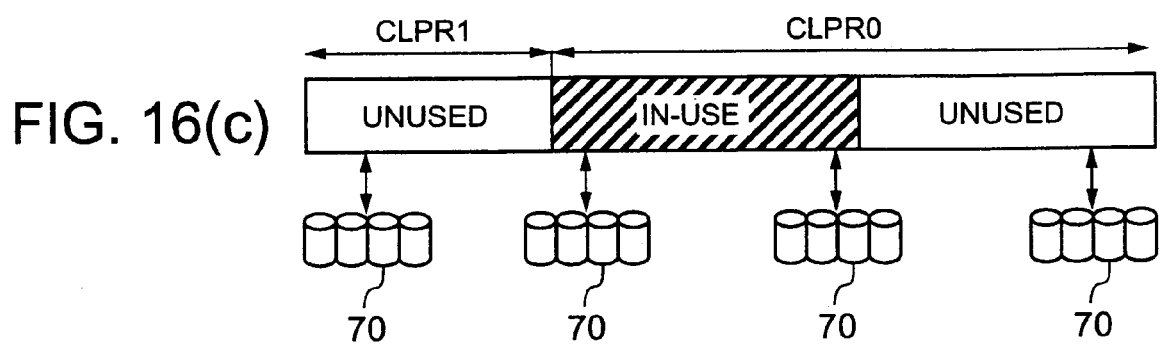
Figure 16D:
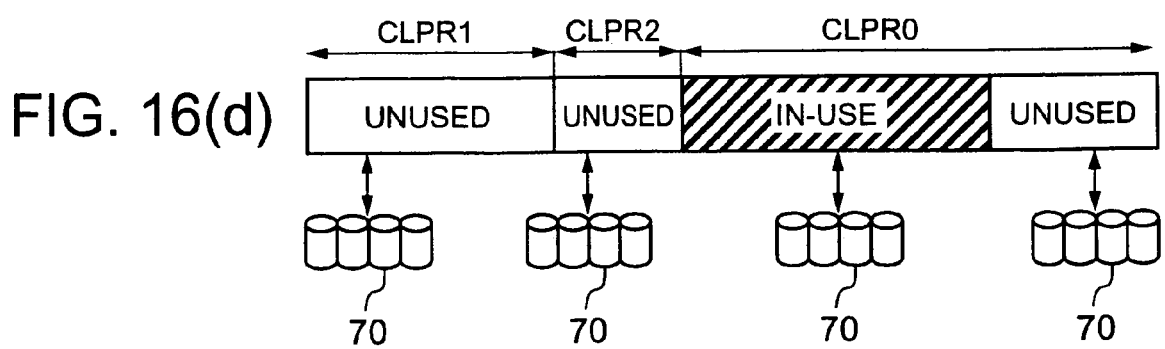

As shown in FIG. 16(a), in an initial state where not a single user-dedicated CLPR is set, all the cache regions of the cache memory 40 belong to the CLPR0. As shown in FIG. 16(b), the cache regions allocated to the CLPR0 can be distinguished as a 'in-use region' that stores various common information and so forth and an 'unused region'. When a user-dedicated CLPR1 is newly set, the required cache region is taken from the CLPR0, which is the pool region, and allocated to the CLPR1, as shown in FIG. 16(c). In addition, when CLPR2 is newly set for usage by another user, a cache region of the required capacity is taken from the CLPR0 used as the pool region and allocated to the newly generated CLPR2, as shown in FIG. 16(d). When a user-dedicated CLPR1 or CLPR2 is deleted, the cache region allocated to the deleted CLPR is returned to the CLPR0.

Figure 17:
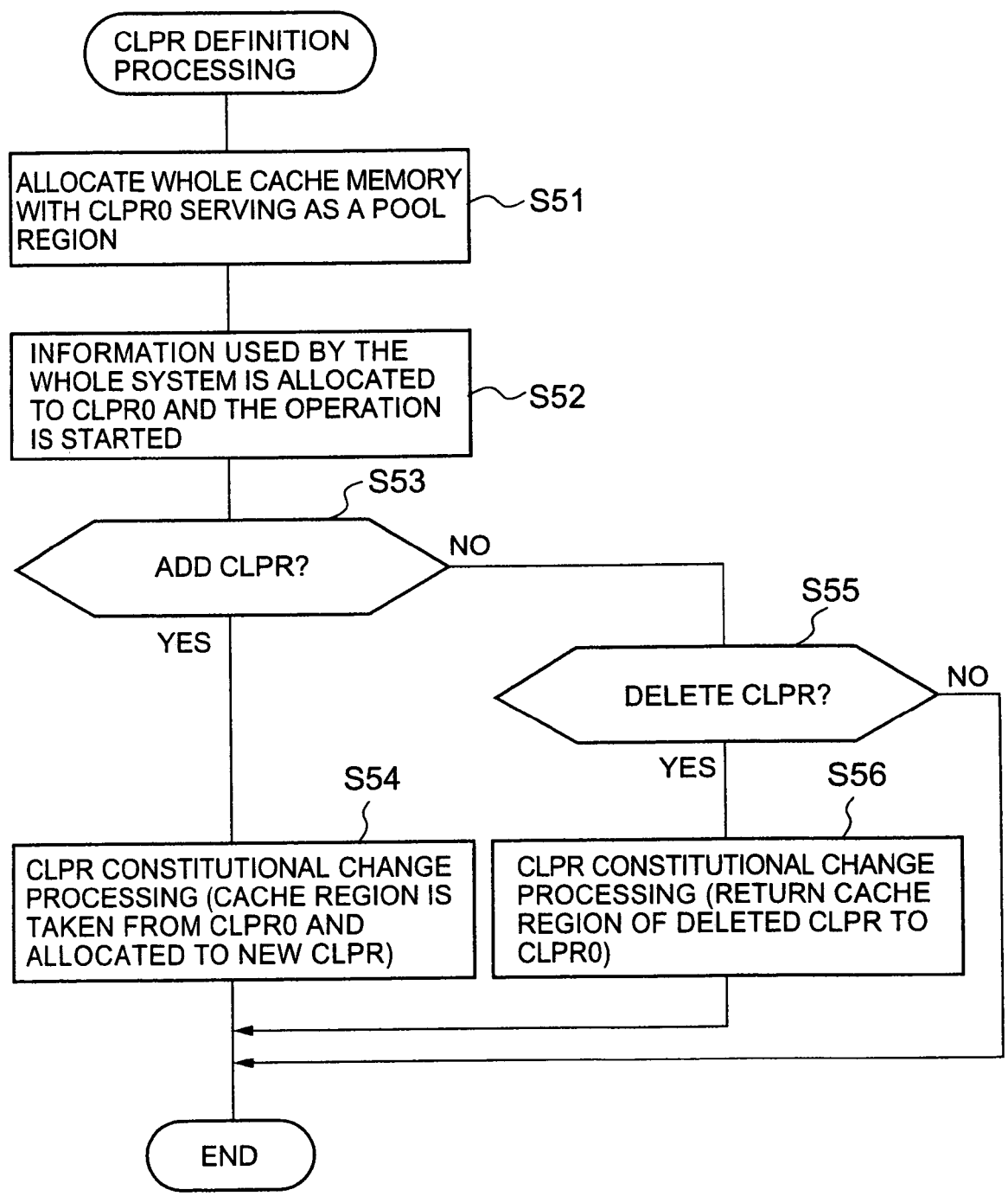
FIG. 17 is a flowchart showing processing in a case where a CLPR is defined.

FIG. 17 is a flowchart that shows the above processing. In an initial state, all the cache regions of the cache memory 40 are allocated to the common region CLPR0 that is used as a pool region (S51). Various information used by the whole storage subsystem 10 is then stored in the CLPR0 and the operation begins (S52).

When a CLPR is newly added (S53:YES), a change to the constitution of the CLPR is made (S54). In the CLPR constitutional change processing, processing that takes a cache region from the CLPR0 and allocates this cache region to a new CLPR is executed. On the other hand, when the newly generated CLPR is deleted (S53: NO, S55: YES), processing to return the cache region allocated to the deleted CLPR to the CLPR0 is performed (S56). Further, as a general rule, the CLPR0 cannot be deleted.

FIG. 18 is an explanatory view of an aspect in which information relating to the CLPR managed by the respective subterminals 2 is displayed and so forth on each subterminal 2.

The SVP 90 comprises an authentication section 91 and a constitutional management unit 92. The administrator of each CLPR accesses the SVP 90 via a subterminal 2 and inputs a user ID and so forth. When, as a result of the user authentication performed by the authentication section 91, it is confirmed that this is a legitimate user, the CLPR administrator is able to make constitutional changes to the CLPR under his or her own management. A constitutional-change operation is then reflected in each CLPR by the constitutional management unit 92. Further, constitution information relating to the CLPR acquired by the constitutional management unit 92 can be displayed on the subterminal 2.

Examples of information that can be displayed on the subterminals 2 can include the maximum cache amount allocated to the CLPR, information relating to the VDEV allocated to the CLPR (VDEV number, volume size, and so forth), the in-use cache size, the unused cache size, and the frequency of IO to and from the CLPR. Further, the system administrator managing the storage subsystem 10 as a whole is able to acquire information relating to all the CLPR via the master terminal 3 and is able to make constitutional changes to each CLPR and so forth.

Thus, according to this embodiment, management information is divided for each CLPR established within the storage subsystem 10. Therefore, interference between the CLPR can be suppressed and the ease of use can be raised. That is, even when access to one CLPR is increased, the effect on another CLPR can be prevented as far as possible.

Furthermore, according to the present embodiment, management information is allocated on the basis of the attribute of the segment or slot. Therefore, in comparison with a constitution in which all the management information is simply provided in each CLPR, the data size of all the management information can be reduced and the shared memory 50 can therefore be used efficiently.

Further, the present invention is not limited to or by the embodiments above. The person skilled in the art is able to make a variety of additions, modifications, and so forth within the scope of the present invention.

What is claimed is:

1. A storage system comprising:
a display device displaying information; and
a disk array system coupled to said display device, comprising:
a plurality of channel adapters, coupled to at least one host computer, which communicate data with said host computer,
a plurality of disk devices relating to at least one logical volume and storing data sent from said channel adapters,
a plurality of disk adapters coupled to said disk devices and causing data sent from said channel adapters to be stored in said disk drives,
a cache memory storing data between said channel adapters and said disk adapters and having a plurality of logical partition regions which partition said cache memory logically, and
a control memory storing management information which relates to said logical partition regions,
wherein said management information includes a plurality of first management information and second management information, each of said first management information is used to independently manage one of said logical partition regions, and said second management information is used to commonly manage said logical partition regions,
wherein one of said first management information is set/changed, if one of said logical partition regions is set/changed based on a request sent from said display device,
wherein said management information includes a plurality of queues and at least one counter associated with the at least one queue, and
wherein at least one of said queues includes partition management information and a counter associated with the at least one of said queues indicates a next entry of the at least one of said queues to be used.

2. The storage system according to claim 1, wherein said first management information and said second management information are established based on an indication of a kind of status in which data is stored in one of said logical partition regions.

3. The storage system according to claim 1, wherein said management information is constituted by submanagement information of a plurality of types; and
wherein said partition management information are constituted by partitioning, based on an indication of a kind of status in which data is stored in one of said logical partition regions, some of the submanagement information items for each of the cache partition regions, the remainder of the submanagement information being used as said second management information.

4. The storage system according to claim 1, wherein the management information is constituted by queues of a plurality of types, and counters that are associated with each of the queues; and
wherein said first partition management information are constituted by providing some of the queues and counters in each of the logical partition regions based on an indication of a kind of status in which data is stored in an area of the logical partition region, the, remainder of the queues and the remainder of the counters being used as said second management information.

5. The storage system according to claim 4, wherein one of a first queue of the queues and a first counter of the counters, which is associated with said first queue, constitutes said first management information, and the other is used as said second management information.

6. The storage subsystem according to claim 4, wherein a queue management table is associated with each queue, and the queue management table associated with a queue that constitutes said first management information is provided in each of the logical partition regions.

7. The storage system according to claim 1, wherein the management information includes:
a free queue to which a cache management unit in an unused state is connected and a free queue counter associated with the free queue,
a dirty queue to which a cache management unit for storing data in a dirty state prior to reflection in a storage device group is connected and a dirty queue counter associated with the dirty queue,
a clean queue to which a cache management unit for storing data in a clean state that has been reflected In the storage device group is connected and a clean queue counter associated with the clean queue, and an in-use counter that counts the total capacity of in-use areas in said cache memory, wherein the free queue counter, the clean queue, the clean queue counter and the in-use counter are provided in each of the logical partition regions and each constitute said first management information, and wherein the free queue, the dirty queue, and the dirty queue counter are used as said second management information.

8. The storage system according to claim 1, wherein each of the logical partition regions can be established for each of the channel adapters.

9. The storage system according to claim 1, wherein one logical partition region among the logical partition regions is established as a common region and a new logical partition region is established by allocating resources belonging to the common region.

10. A method for controlling a storage system that comprises:

a display device displaying information; and a disk array system coupled to said display device, which includes:

a plurality of channel adapters, coupled to at least one host computer, which communicate data with said host computer, a plurality of disk devices relating to at least one logical volume and storing data sent from said channel adapters, a plurality of disk adapters coupled to said disk devices and causing data sent from said channel adapters to be stored in said disk drives, and a cache memory storing data between said channel adapters and said disk adapters and having a plurality of logical partition regions which partition said cache memory logically, said method comprising the steps of:

storing in a control memory management information which relates to said logical partition regions, wherein said management information includes a plurality of first management information and second management information, each of said first management information is used to independently manage one of said logical partition regions, and said second management information is used to commonly manage said logical partition regions;

setting/changing one of said first management information, if one of said logical partition regions is set/changed based on a request sent from said display device, wherein said management information includes a plurality of queues and at least one counter associated with the at least one queue, and wherein at least one of said queues includes partition management information and a counter associated with the at least one of said queues indicates a next entry of the at least one of said queues to be used.

11. The method according to claim 10, wherein said first management information and said second management information are established based on an indication of a kind of status in which data is stored in one of said logical partition regions.

12. The method according to claim 10, wherein said management information is constituted by submanagement information of a plurality of types; and wherein said partition management information are constituted by partitioning, based on an indication of a kind of status in which data is stored in one of said logical partition regions, some of the submanagement information items for each of the cache partition regions, the remainder of the submanagement information being used as said second management information.

13. The method according to claim 10, wherein the management information is constituted by queues of a plurality of types, and counters that are associated with each of the queues; and wherein said first partition management information are constituted by providing some of the queues and counters in each of the logical partition regions based on an indication of a kind of status in which data is stored in an area of the logical partition region, the remainder of the queues and the remainder of the counters being used as said second management information.

14. The method according to claim 13, wherein one of a first queue of the queues and a first counter of the counters, which is associated with said first queue, constitutes said first management information, and the other is used as said second management information.

15. The method according to claim 13, wherein a queue management table Is associated with each queue, and the queue management table associated with a queue that constitutes said first management information is provided in each of the logical partition regions.

16. The method according to claim 10, wherein the management information includes:

a free queue to which a cache management unit in an unused state is connected and a free queue counter associated with the free queue, a dirty queue to which a cache management unit for storing data in a dirty state prior to reflection in a storage device group is connected and a dirty queue counter associated with the dirty queue, a clean queue to which a cache management unit for storing data in a clean state that has been reflected in the storage device group is connected and a clean queue counter associated with the clean queue, and an in-use counter that counts the total capacity of in-use areas in said cache memory, wherein the free queue counter, the clean queue, the clean queue counter and the in-use counter are provided in each of the logical partition regions and each constitute said first management information, and wherein the free queue, the dirty queue, and the dirty queue counter are used as said second management information.

17. The method according to claim 10, wherein each of the logical partition regions can be established for each of the channel adapters.

18. The method according to claim 10, wherein one logical partition region among the logical partition regions is established as a common region and a new logical partition region is established by allocating resources belonging to the common region.

* * * * *